United States Patent [19]

Shoji

[11] Patent Number: 5,313,902
[45] Date of Patent: May 24, 1994

[54] PATTERN DATA PROCESSING DEVICE FOR SEWING MACHINE

[75] Inventor: Yoshihisa Shoji, Okazaki, Japan

[73] Assignee: Brother Kogyo Kabushiki Kaisha, Aichi, Japan

[21] Appl. No.: 926,405

[22] Filed: Aug. 10, 1992

[30] Foreign Application Priority Data

Aug. 8, 1991 [JP]  Japan .................................. 3-199504

[51] Int. Cl.$^5$ ............................................. D05B 3/02
[52] U.S. Cl. ..................................... 112/454; 112/456; 112/457
[58] Field of Search .............. 112/454, 456, 458, 457, 112/121.12, 103, 453, 121.11; 364/470

[56] References Cited

U.S. PATENT DOCUMENTS

4,557,207 12/1985 Turner et al. ..................... 112/454
4,823,714  4/1989 Yokoe et al. ............... 112/121.12 X
5,156,107 10/1992 Kyuno et al. .................. 112/454 X

FOREIGN PATENT DOCUMENTS

63-255093 10/1988 Japan ................................. 112/454

*Primary Examiner*—Peter Nerbun
*Attorney, Agent, or Firm*—Oliff & Berridge

[57] ABSTRACT

A pattern data processing device processes a pattern data adapted for controlling a sewing machine to attain a relative movement between a cloth to be stitched and a sewing needle of the sewing machine thereby forming a desired stitch pattern on the cloth. The pattern data processing device includes: a unit pattern storing device for storing a plurality of pattern data each for forming a unit-pattern; a reference pattern storing device for storing pattern data for forming a reference pattern inside or outside of which the unit-pattern is to be arranged and position-relevant data indicative of positions at which the unit-pattern is to be arranged inside or outside of the reference pattern; a unit-pattern selecting apparatus for selecting pattern data corresponding to a desired unit-pattern from the unit-pattern storing device; synthesizing device for a synthesizing a pattern data for a composite pattern in which the selected unit-pattern is arranged inside or outside of the reference pattern, on the basis of the pattern data of the selected unit-pattern and the pattern data of the reference pattern and the position-relevant data; and a composite pattern storing apparatus for storing the synthesized pattern data for the composite pattern.

28 Claims, 16 Drawing Sheets

| bit | CONTENT | |
|---|---|---|
| 7 | FRAME PATTERN ? | (0/1) |
| 6 | MOTOR STOPPED ? | (0/1) |
| 5 | NEEDLE LOCATION AT LEFT-AND-UPPER CORNER OF PATTERN GROUP | (0/1) |
| 4 | NEEDLE LOCATION AT RIGHT-AND-UPPER CORNER OF PATTERN GROUP | (0/1) |
| 3 | X-COORDINATE OF REFERENCE POSITION OF PATTERN GROUP (X,_) | |
| 2 | | |
| 1 | Y-COORDINATE OF REFERENCE POSITION OF PATTERN GROUP (_,Y) | |
| 0 | | |

61 — bit 5
63 — bit 4
65 — bits 3,2
67 — bits 1,0

FIG. 16

70: BUFFER 1

PATTERN NUMBER (EXAMPLE)

| 33 | 72 | 101 | 134 | ... | 305 | 183 | 232 | ... | 255 | FF |

| PATTERN GROUP | 0-GROUP FIGURE FRAME | 1-GROUP | 2-GROUP FIRST-LINE CHARACTERS | | | 3-GROUP SECOND-LINE CHARACTERS | | | END CODE |
|---|---|---|---|---|---|---|---|---|---|
| COMBINATION POSITION NO. | 0 | 1 | 2 | 3 | ... | n1 | n1+1 | n1+2 | ... | n2 | FF |
| EXAMPLES OF PATTERN AND PATTERN NUMBER THEREOF | FIGURE FRAME 33 | FIGURE FRAME 72 | CHAR-ACTER 11 101 | CHAR-ACTER 12 134 | ... | CHAR-ACTER 1n 305 | CHAR-ACTER 21 183 | CHAR-ACTER 22 232 | ... | CHAR-ACTER 2n 255 | FF |

PATTERN DATA PROCESSING DEVICE FOR SEWING MACHINE

BACKGROUND OF THE INVENTION

1. Field of the Invention

The present invention relates to a pattern data processing device for processing pattern data with which the relative movement between a cloth to be stitched and a sewing needle (i.e., a sewing operation) is controlled to form a stitch pattern corresponding to the pattern data onto the cloth.

2. Description of Related Art

There has been conventionally utilized a sewing machine for forming on a cloth various patterns, for example, a character pattern such as numerals, alphabets, etc., a figured-pattern such as illustration, ornament, etc., a frame pattern such as a linear line, a curved line, etc., and so on. With the use of the conventional sewing machine capable of forming the above patterns on the cloth, for example, a figured pattern G, a character pattern M and a frame pattern W can be automatically and individually formed on the cloth to form a composite pattern on the cloth, as shown in each of FIGS. 18(A), 18(B) and 18(C). In the case where the composite pattern as shown in each of FIGS. 18(A) through (C) is formed on a piece of cloth, a name tag is obtained. In the case where the composite pattern is formed on an outer surface of a bag formed of cloth at its position, for example, a bag of cloth integrally formed with a name tag is obtained.

In order to perform such a composite-pattern sewing operation, every time when the sewing operation for each of the patterns G, M and W is completed, an operator has to move the cloth while paying his or her attention to a relative stitching position between a pattern to be formed next and the previously-formed pattern (hereinafter referred to as "combination position of a pattern"), and then select the pattern to be formed next, to allow the sewing machine to automatically perform the sewing operation for the next pattern. The above-described operation is repetitively carried out until when the composite pattern (e.g., a name tag pattern as shown in FIG. 18) is finally formed on the cloth.

In the conventional sewing machine as described above, therefore, the operator has to determine the combination position of each two patterns with his sense. In other words, the operator has to move the cloth to the desired combination position for the next pattern manually paying his attention to the position. Therefore, the conventional sewing machine has a disadvantage in that it is difficult to accurately locate each pattern at a corresponding desired position (i.e., to accurately combine a plurality of patterns with one another at relative suitable positions with respect to one another). This is because the operator may not accurately grasp a size of a respective one of the plural patterns, a stitch-starting position and a stitch-ending position of the respective one of the plural patterns which are individually different from one another. Therefore, there has been conventionally frequently occurred the problem that a character array (an array of character patterns) erroneously protrudes beyond a frame pattern or the problem that patterns which are required to be linked with each other in design are formed erroneously separately from each other.

SUMMARY OF THE INVENTION

An object of the present invention is to provide a pattern data processing device for a sewing machine in which a sewing operation for a composite pattern can be easily performed.

According to a first aspect, the present invention provides a pattern data processing device 100 for a sewing machine 101 for processing a pattern data which is adapted for controlling the sewing machine 101 to attain a relative movement between a cloth to be stitched and a sewing needle of the sewing machine to thereby form a desired stitch pattern on the cloth. The pattern data processing device 100 of the present invention includes: unit pattern storing means 102 for storing a plurality of pattern data each for forming a unit-pattern; reference pattern storing means 103 for storing pattern data for forming a reference pattern inside or outside of which the unit-pattern is to be arranged and position-relevant data indicative of positions at which the unit-pattern is to be arranged inside or outside of the reference pattern; unit-pattern selecting means 104 for selecting pattern data corresponding to a desired unit-pattern from said unit-pattern storing means; synthesizing means 105 for synthesizing a pattern data for a composite pattern in which the selected unit-pattern is arranged inside or outside of the reference pattern, on the basis of the pattern data of the unit-pattern selected by the unit-pattern selecting means 104 and the pattern data of the reference pattern and the position-relevant data which are both stored in the reference pattern storing means 103; and composite pattern storing means 106 for storing the synthesized pattern data for the composite pattern which is obtained by the synthesizing means.

According to the pattern data processing device thus constructed, the pattern data corresponding to at least one desired unit-pattern is selected from the unit-pattern storing means 102 by the unit-pattern selecting means 104. On the basis of the pattern data for the reference pattern and the position-relevant data which are both stored in the reference pattern storing means 103 and the pattern data of the selected unit-pattern, the synthesizing means 105 synthesizes or forms a pattern data for forming a composite pattern in which the selected unit-pattern is located at a predetermined position inside or outside of the reference pattern. The pattern data for the composite pattern thus obtained by the synthesizing means 105 is stored in the composite pattern storing means 106.

The pattern data thus obtained to be stored in the composite pattern storing means 106 is used to control the relative movement between the cloth to be stitched and the sewing needle in a sewing operation for forming a desired composite pattern on a cloth. The sewing machine therefore automatically carries out the stitching operation for the composite pattern, based on the pattern data of the composite pattern.

According to a second aspect of this invention, as shown in FIG. 2, in the pattern data processing device 100 according to the first aspect of this invention, the unit-pattern selecting means 104 selects a plurality of desired unit patterns, and the position-relevant data represents a pattern forming region at which the unit-patterns are to be arranged, the pattern forming region being positioned inside or outside of the reference pattern. The synthesizing means 105 includes center-coincident pattern allot means 107 for allotting the selected plural unit-patterns in the pattern forming region in such a manner that the center position of a unit-pattern group formed of the selected plural unit-patterns may coincide with the center position of the pattern forming region.

In the pattern data processing device thus constructed, the position-relevant data represents the pattern forming region inside or outside of the reference pattern in which the unit-patterns are to be arranged. The center-coincident allot means 107 provided in the synthesizing means 105 allots the selected plural unit-patterns in the unit-pattern forming region in such a manner that the center position of a unit-pattern group formed of the selected plural unit-patterns may coincide with the center position of the forming region.

In a composite pattern formed by a sewing machine on the basis of the pattern data thus obtained, irrespective of the number of the selected unit-patterns, the center position of the unit-pattern group consisting of the selected plural unit-patterns substantially coincides with the center position of the desired unit-pattern forming region inside or outside of the reference pattern.

According to a third aspect of this invention, as shown in FIG. 3, in the pattern data processing device according to the first aspect of this invention, the unit-pattern selecting means 104 selects a plurality of unit-patterns, and the position-relevant data includes data indicative of an alignment direction in which the selected plural unit-patterns are to be aligned and an alignment reference point based on which the selected plural unit-patterns are to be aligned, and wherein the synthesizing means 105 includes alignment allot means 108 for allotting the selected plural unit-patterns along the alignment direction and for allowing the selected plural unit-patterns to be aligned at its starting and/or ending point to be positioned at the alignment reference point.

In the pattern data processing device thus constructed, the position-relevant data includes the data indicative of the alignment direction along which the selected plural unit-patterns are to be aligned and the alignment reference points therefor. The alignment allot means 108 provided in the synthesizing means 105 performs the alignment-allotting operation in which the selected plural unit-patterns are aligned in the alignment direction with the alignment starting and/or ending point being positioned at the alignment reference point.

In a composite pattern formed by a sewing machine on the basis of the pattern data thus obtained, the unit-patterns are aligned along the alignment direction represented by the position-relevant data, inside or outside of the reference pattern. The alignment of the unit-patterns is started or ended at the alignment reference point represented by the position-relevant data.

According to a fourth aspect of this invention, as shown in FIG. 4, in the pattern data processing device 100 according to any one of the first to third aspects of this invention, the reference pattern storing means 103 stores plural pattern data each for forming corresponding one of plural reference patterns and plural position-relevant data each indicative of positions at which the unit-pattern is to be arranged inside or outside of the corresponding one of the reference patterns. In this case, the pattern data processing device 100 further includes reference pattern selecting means 109 for selecting pattern data corresponding to a desired reference pattern and the position-relevant data corresponding thereto, from the reference pattern storing means.

In the pattern data processing device thus constructed, the data (pattern data and position-relevant data) corresponding to a desired reference pattern is selected by the reference pattern selecting means 109 from the pattern data of the plural reference patterns and the position-relevant data therefor which are stored in the reference pattern storing means 103.

Accordingly, the relative movement between the cloth to be stitched and the sewing needle is controlled, on the basis of the synthesized pattern data stored in the composite pattern storing means 106, to form a desired composite pattern consisting of a combination of the selected unit-pattern(s) and the selected reference pattern. With the synthesized pattern data thus obtained, the sewing machine can automatically perform a sewing operation for the desired composite pattern which is a combination of the selected unit-pattern(s) and the selected reference pattern.

BRIEF DESCRIPTION OF THE DRAWINGS

FIG. 16 is a schematic diagram showing the memory construction of a buffer 1;

DETAILED DESCRIPTION OF THE PREFERRED EMBODIMENTS

A preferred embodiment according to the present invention will be described with reference to the accompanying drawings.

Figure 1:
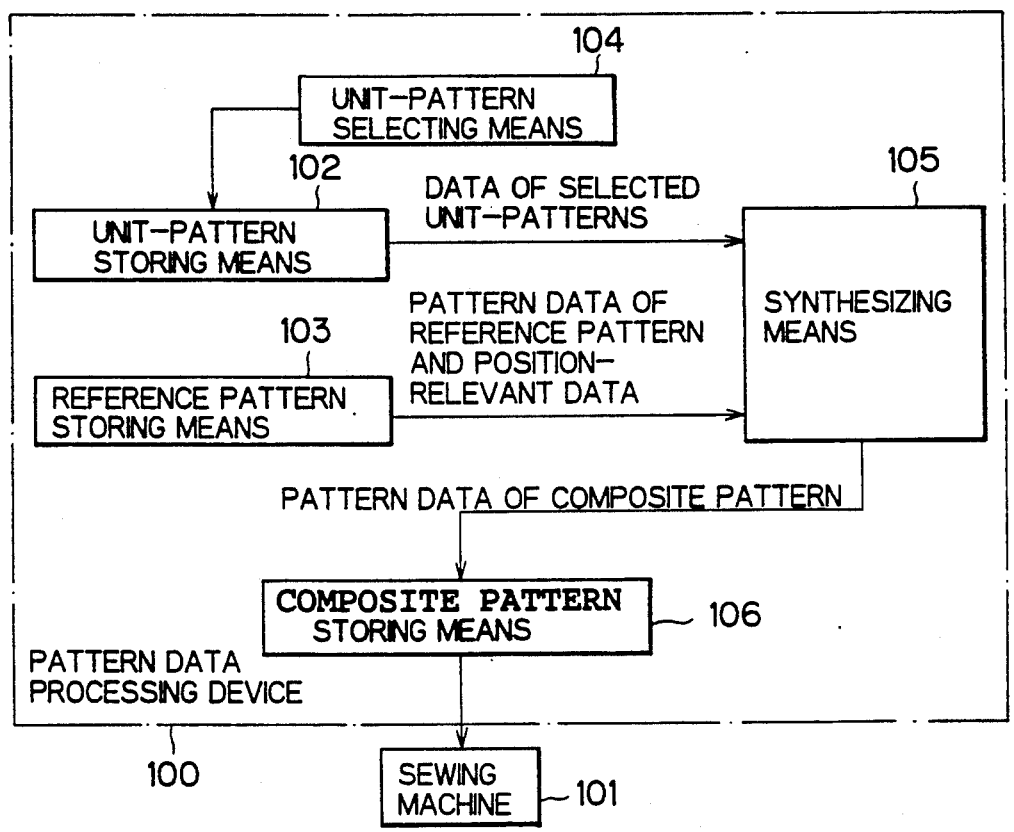
FIG. 1 is a block diagram showing the basic construction of the pattern data processing device for a sewing machine according to a first aspect of the present invention.
Figure 2:
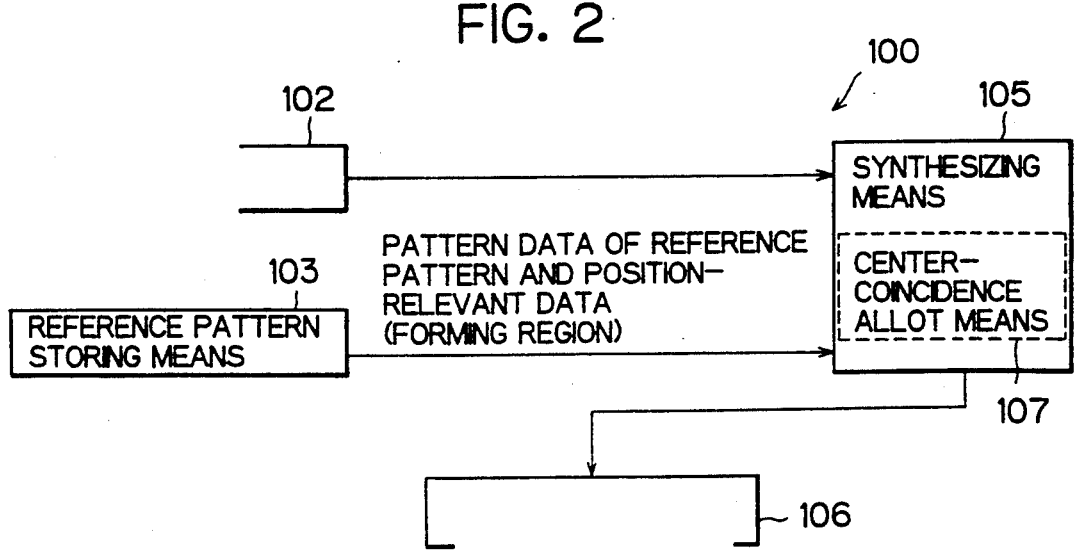
FIG. 2 is a block diagram showing the basic construction of an essential part of the pattern data processing device for a sewing machine according to a second aspect of the present invention.
Figure 3:
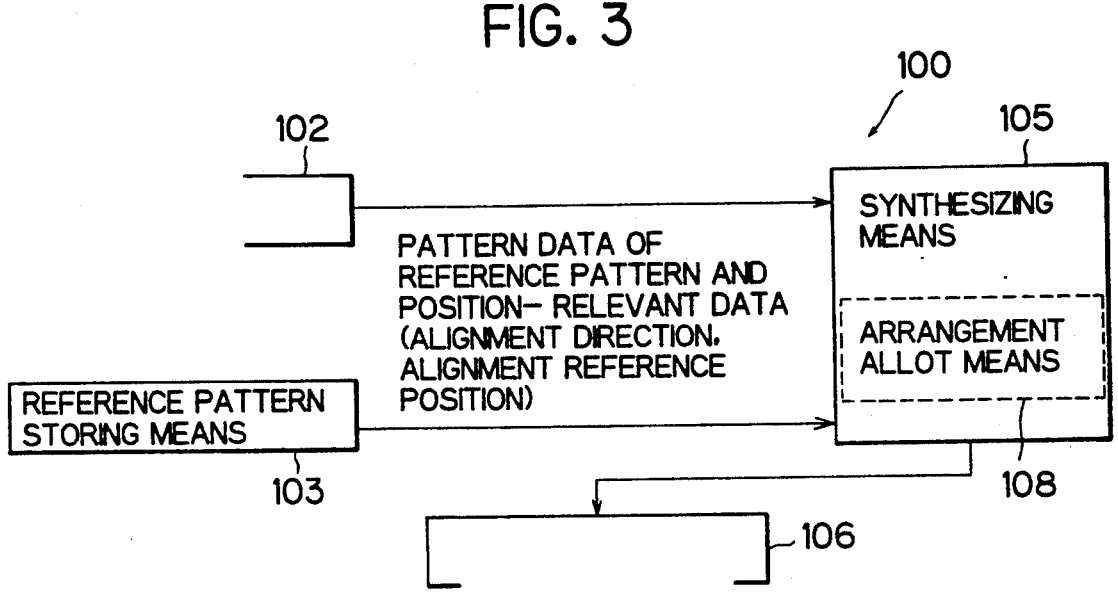
FIG. 3 is a block diagram showing the basic construction of an essential part of the pattern data processing device for a sewing machine according to a third aspect of the present invention.
Figure 4:
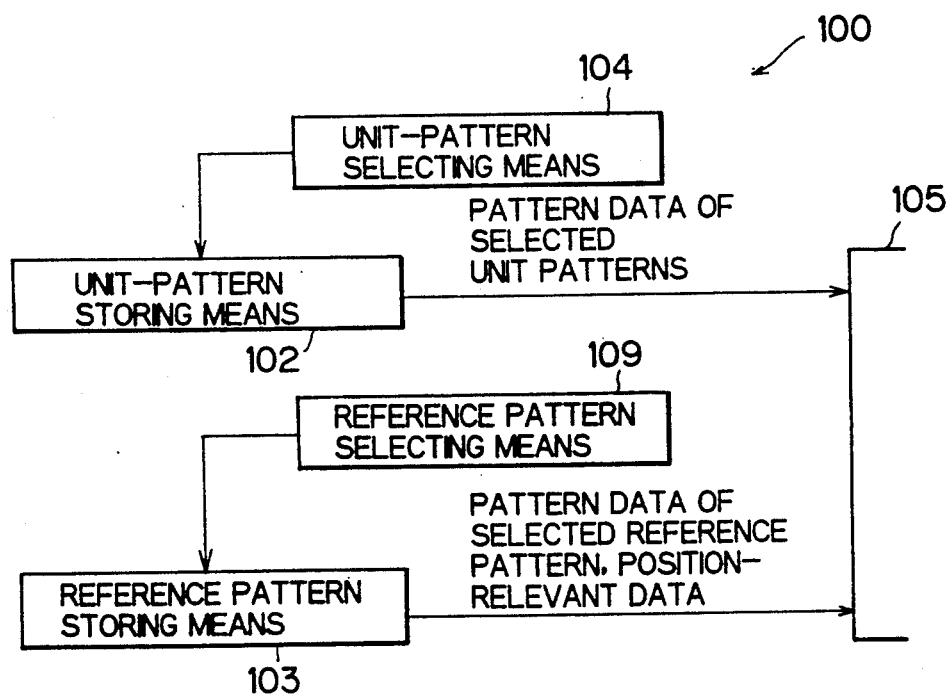
FIG. 4 is a block diagram showing the basic construction of an essential part of the pattern data processing device for a sewing machine according to a fourth aspect of the present invention.
Figure 5:
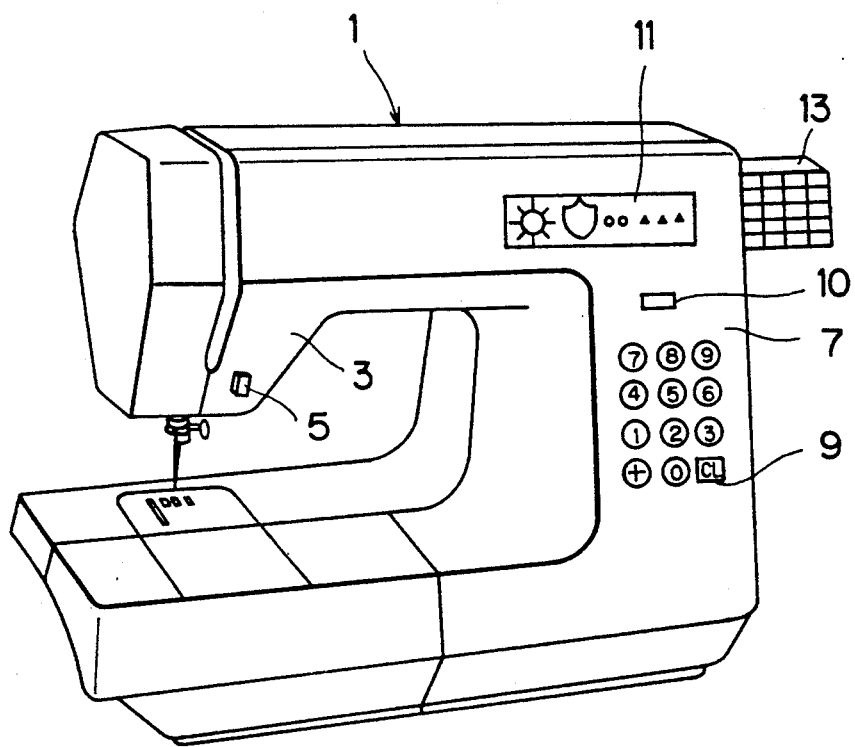
FIG. 5 is a perspective view of a sewing machine to which the present invention is applied.

FIG. 5 shows the whole construction of a zigzag sewing machine 1 equipped with a data processing device according to the present invention. The zigzag sewing machine 1 as shown in FIG. 5 has a cloth laterally-feeding function, and mainly includes a bed body, a leg body 7 projected from the bed body, and an arm body. The head portion 3 of the arm body is equipped with an actuating/stopping switch 5, and the leg body 7 is provided with a pattern selecting key group 9 for selecting a desired pattern and a name tag mode setting key 10 for setting a name tag mode for producing a name tag. The pattern selecting key group 9 includes a ten key, a plus key, a clear key and starting and ending keys (not shown in the drawing). On the upper portion of the leg body 7, there is provided a liquid crystal display device (hereinafter referred to as "LCD") 11 for displaying the number representing a selected pattern or a figure thereof. A card-inserting inlet for receiving a pattern card 13 as will be described later is provided on the leg body 7, at its side wall. Detection switches A and B for discriminating the kind of a pattern card 13 inserted in the card-inserting inlet are provided inside of the card-inserting inlet.

Figure 6A:
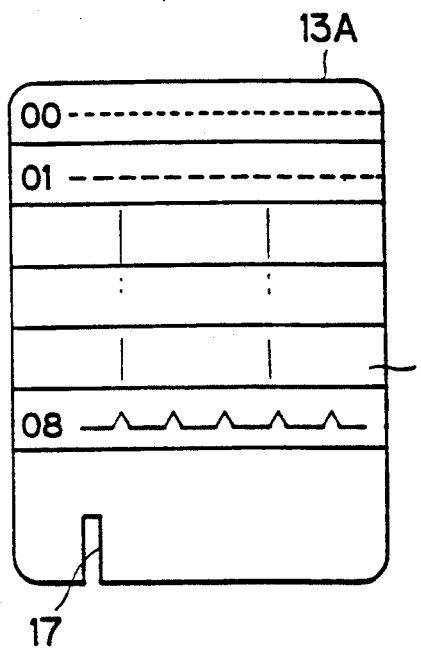
FIGS. 6(A), 6(B), 6(C) and 6(D) show examples of pattern cards.
Figure 6B:
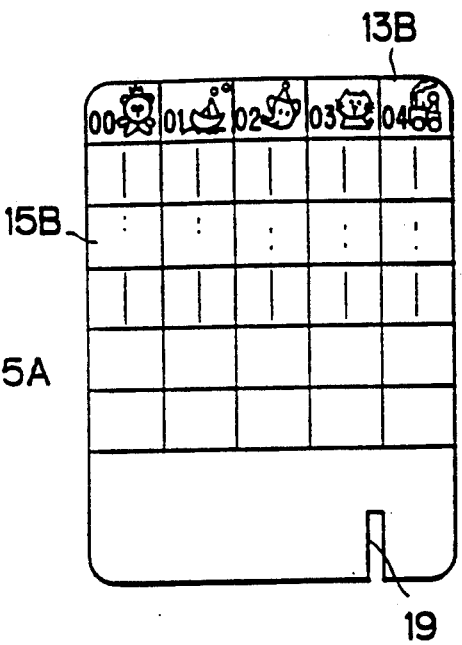
Figure 6C:
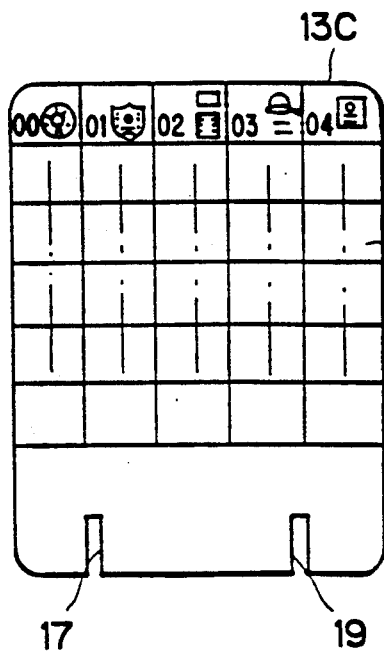
Figure 6D:
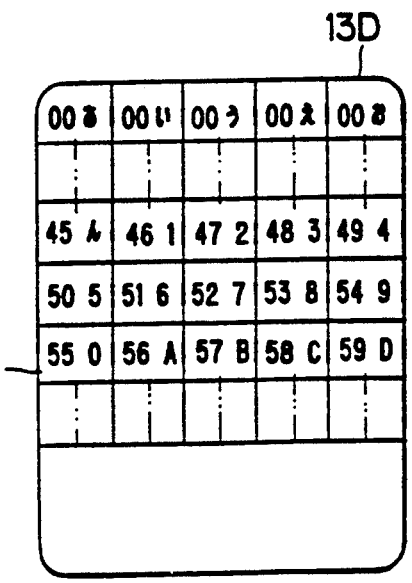

As to the pattern card 13, four kinds of cards 13A, 13B, 13C and 13D as shown in FIGS. 6(A) to 6(D) are provided. The pattern card 13A as shown in FIG. 6(A) is a practical pattern card for selecting a desired practical pattern such as a stitch pattern. The pattern card 13B as shown in FIG. 6(B) is a figured-pattern card for selecting a desired figured pattern G such as an illustration of an animal, a vehicle, etc. The pattern card 13C as shown in FIG. 6(C) is a frame-pattern card for selecting a desired frame pattern W formed of linear lines, curved lines, etc. The pattern card 13D as shown in FIG. 6(D) is a character-pattern card for selecting a desired character or letter pattern M such as "numerals", "alphabet letters", "hiragana letters", "katakana letters", "kanji letters", other symbolic letters or characters, etc.

The pattern cards 13B, 13C and 13D are utilized in a name tag sewing operation which will be described later. More specifically to say, in the case where an operator is desired to produce a name tag consisting of a desired figure pattern G, a desired frame pattern W and desired first and second character lines M1 and M2, the operator selects the desired figure pattern G from the figure patterns displayed on the card 13B, the desired frame pattern W from the frame patterns displayed on the card 13C, and desired characters from the character patterns displayed on the card 13D for the first and second character lines M1 and M2. In response to the operator's selecting operation, the sewing machine performs the name tag sewing operation in which the sewing machine automatically arranges the operator's selected figure pattern G, frame pattern W and character line patterns M1 and M2 in such relative positions with respect to one another as attaining good appearance to form a desired composite pattern and form an embroidery pattern of the composite pattern, to thereby produce the operator's selected name tag.

The pattern cards 13A, 13B, 13C and 13D (hereinafter referred to as "pattern card 13" as occasion demands) are provided with display parts 15A, 15B, 15C and 15D, respectively, on each of which a plurality of patterns to be selected and identification numbers allotted therefor are displayed. (The display areas 15A, 15B, 15C and 15D provided on the cards 13A, 13B, 13C and 13D will be referred to as "the display area 15", hereinafter, as occasion demands.) The display area 15 is printed on a surface of the pattern card 13 at such a position that the operator may look up his or her desired pattern in the display area 15 in such a state that the pattern card 13 is inserted in the card inserting inlet of the sewing machine 1.

Cut-out portions 17 and 19 are selectively formed on the lower portion of each of the pattern cards 13A, 13B, 13C and 13D. The kind of the pattern card is therefore discriminatable on the basis of whether or not the cut-out portions 17 and 19 are formed thereon. The cut-out portions 17 and 19 are provided on the pattern card, at such positions as to correspond to the positions of the detection switches A and B when the pattern card is inserted into the card inserting inlet of the sewing machine. Therefore, the contact state of each of the detection switches A and B is varied, in accordance with the presence of each of the cut-out portions 17 and 19 of the pattern cards. Accordingly, a combination state of the contact states of the detection switches A and B indicate the kind of the card 13 which is now inserted in the card inserting inlet.

Figure 7:
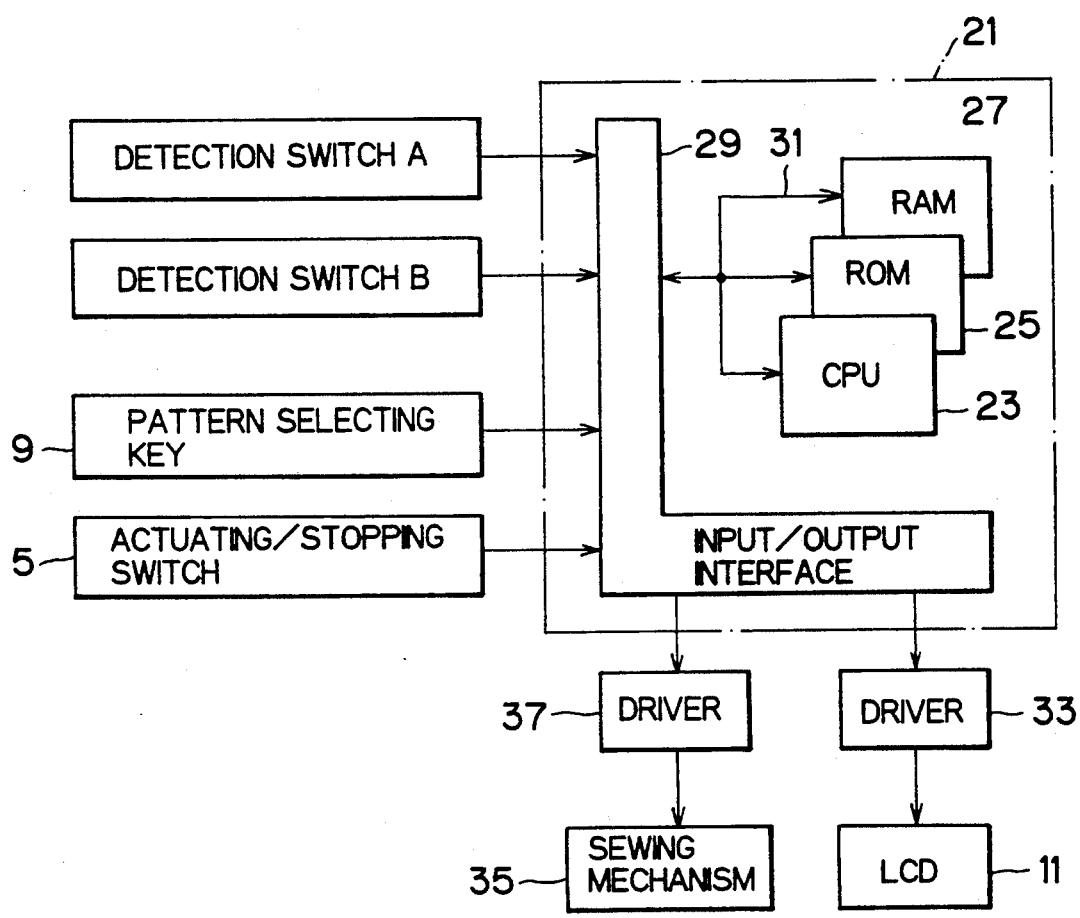
FIG. 7 is a block diagram showing an electrical control device of the sewing machine.

FIG. 7 is a block diagram of the electrical construction of the sewing machine 1. The sewing machine installs therein an electrical control device 21. The electrical control device 21 is a computer including a CPU 23, a ROM 25, a RAM 27, an input/output interface 29 which are interconnected to one another through a bus 31. The input/output interface 29 is connected to the detection switches A and B, the pattern selecting key group 9, and the actuating/stopping switch 5. The input/output interface 29 is further connected to a driver 33 for actuating the LCD 11 and a driver 37 for actuating a sewing mechanism 35 including a sewing needle, a feed dog, etc. The interface 29 is further connected to the name tag mode selecting key 10 (not shown in the drawing).

Figure 11:
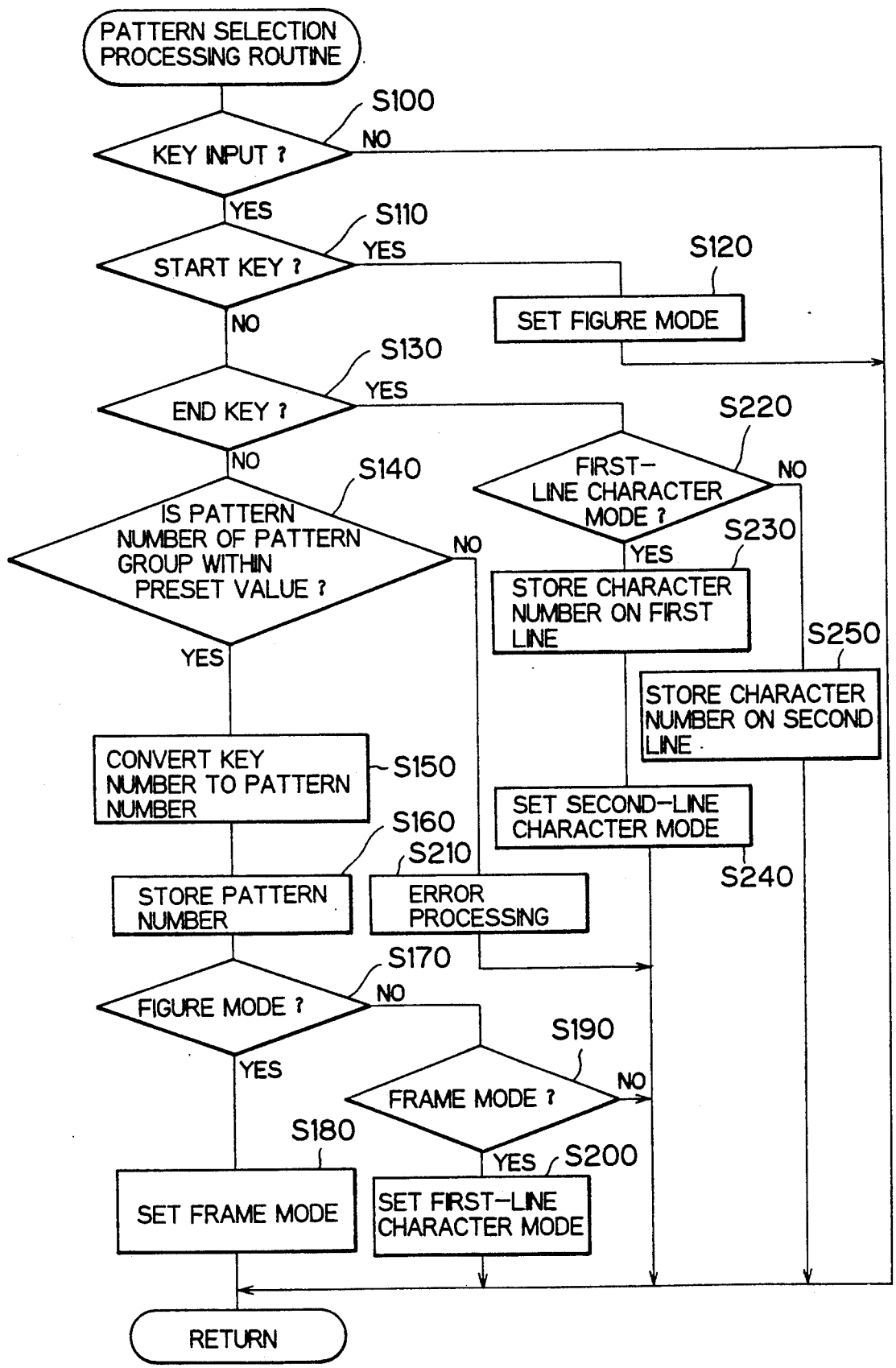
FIG. 11 is a flowchart for a pattern selection processing routine which is executed by CPU.

The ROM 25 is stored with programs for a pattern selecting processing routine (which will be described later with reference to FIG. 11) and a sewing-data forming processing routine (which will be described later with reference to FIGS. 12 to 15) for the name tag sewing operation and other various processing routines for the sewing operation.

Figure 8:
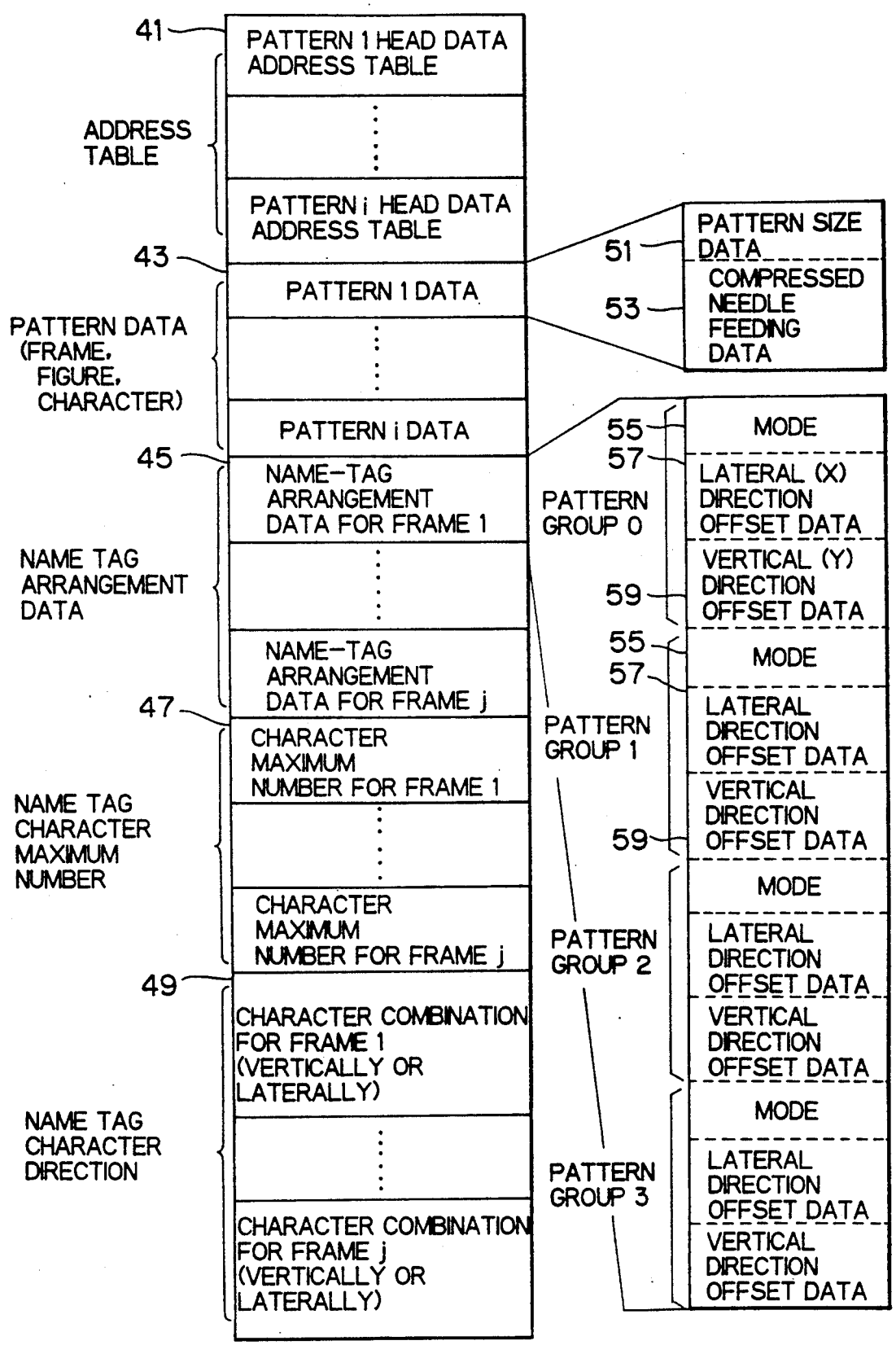
FIG. 8 shows the memory construction of data stored in a ROM.

In addition, the ROM 25 is beforehand stored with data required for performing a sewing operation of a plurality of patterns. The data thus stored beforehand in the ROM include data of an address table 41, pattern data 43, name-tag arrangement data 45, data 47 of the maximum number of the character patterns which are able to be combined with each one of the frame patterns to form a name tag, and data 49 of direction in which character patterns are to be aligned to be combined with each one of the frame patterns to form a name tag, as shown in FIG. 8.

The address table 41 includes head address data indicative of storing positions at which respective ones of a plurality of pattern data 43 are stored in the ROM 25.

The plurality of pattern data 43 include plural pattern data for all the figure patterns G displayed on the pattern card 13B to be selectable by the operator, plural pattern data for all the frame patterns W displayed on the pattern card 13C to be selectable by the operator, and plural pattern data for all the character patterns M displayed on the pattern card 13D to be selectable by the operator.

Each of the plural pattern data 43 includes data 51 indicative of the maximum-size of an outline of each pattern and compressed needle-feeding data 53 for the sewing operation for each pattern. As the compressed needle-feeding data 53 for each stitch, in place of data for feeding the needle for every stitch, a block data which include an apex data of each of a plurality of blocks which are obtained though dividing a pattern and a stitch density data for the each block may be used.

A name tag obtainable through the name tag sewing operation of the sewing machine of the present invention has such a composite pattern as consisting of a single figure pattern G, a single frame pattern W, and one line M1 (or two lines M1 and M2) each consisting of an array of at least one character patterns M. Any one of the figure patterns displayed on the pattern card 13B is selectable for the figure pattern G. Similarly, any one of the frame patterns displayed on the pattern card 13C is selectable for the frame pattern W. Any one of the character patterns displayed on the pattern card 13D is selectable for each one of the characters constituting the one or two lines.

Accordingly, it is possible to combine each one of the frame patterns W displayed on the pattern card 13C with any one of the figure patterns G displayed on the pattern card 13B. It is noted, however, that a single relative position (combination positions) in which any of all the figure patterns G should be positioned with respect to each frame pattern W is determined for the each frame pattern W.

Each frame pattern W can be combined with the one or two character lines M1 or M2 which extend in either one of vertical and lateral directions. In other words, the direction in which the character line(s) which can be combined with each frame pattern W is determined for the each frame pattern W. In addition, the maximum number of the character patterns of each of the first and second character lines M1 and M2 which can be combined with each frame pattern W is determined for the each frame pattern W. Accordingly, each frame pattern W can be combined with the first (and second) character lines M1 (and M2) each consisting of the character patterns selected from the pattern card 13D, the number of which is within the maximum number determined for the each frame pattern W. It is noted furthermore that a single relative position (combination position) in which any character line M1 should be positioned with respect to each frame pattern W is determined for the each frame pattern W. Similarly, a single relative position (combination position) in which any character line M2 should be positioned with respect to each frame pattern W is also determined for the each frame pattern W.

Figure 18A:
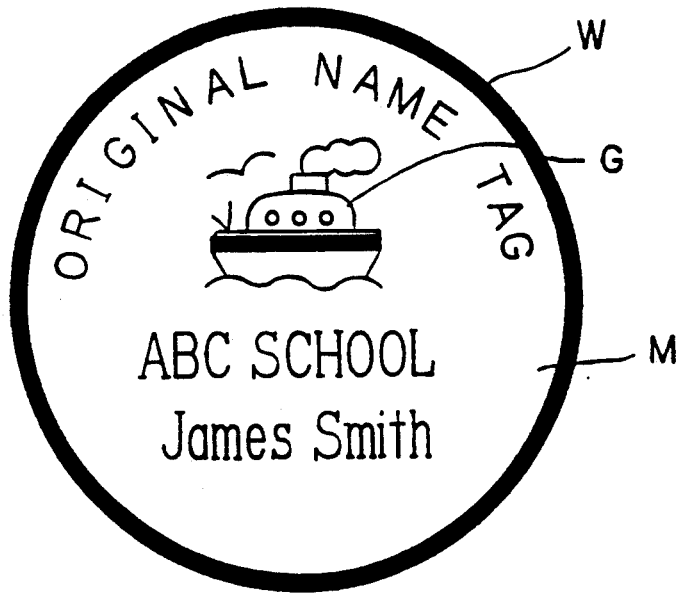
FIGS. 18(A), 18(B) and 18(C) show examples of a name tag which are formed using the pattern data processing device.

For example, for the frame pattern W shown in FIG. 18(A), it is determined that any figure pattern G and any character lines M1 and M2 extending laterally should be positioned relative to the frame pattern W, as shown in the drawing. On the other hand, for the frame pattern W shown in FIG. 18(B), it is determined that any figure pattern G and any character lines M1 and M2 extending vertically should be positioned relative to the frame pattern W, as shown in the drawing.

The name tag arrangement data 45 include information on the relative positions (combination positions) in which any figure pattern G, any character line M1, and any character line M2 should be positioned relative to each of the frame patterns W. In other words, the name tag arrangement data 45 include a plurality of arrangement data each of which represents the manner how any of the figure patterns G (pattern group 0), any of the first character lines M1 (pattern group 2), and any of the second character lines M2 (pattern group 3) should be arranged relative to each frame pattern W, as will be described hereinafter.

More specifically to say, the name tag arrangement data 45 include arrangement data for the respective frame patterns W. The arrangement data for each frame pattern W includes four combination data, each of which is assigned to a corresponding one of four pattern groups (pattern group 0 representing any of all the figured patterns G, pattern group 1 representing any of all the frame patterns W, pattern group 2 representing any plural character patterns M to form the first line M1, and pattern group 3 representing any plural character patterns M to form the second line M2). (Each of the four pattern groups therefore consists of a corresponding single kind of patterns.) Each of the four combination data consists of a mode data 55, lateral(X)-direction offset data 57, and vertical(Y)-direction offset data 59. It is noted that since the name-tag arrangement data 45 determined for each frame pattern W (which corresponds to each reference pattern) thus include a combination data assigned to the pattern group 1 consisting of the frame-patterns W, the mode 55 and the offset data 57 and 59 can be used for the frame pattern W similarly as for other patterns G, M1 and M2. It should be noted that the X- and Y-offset data 57 and 59 of the combination data for the pattern group 1 are both set to 0.

Figures 9, 10:
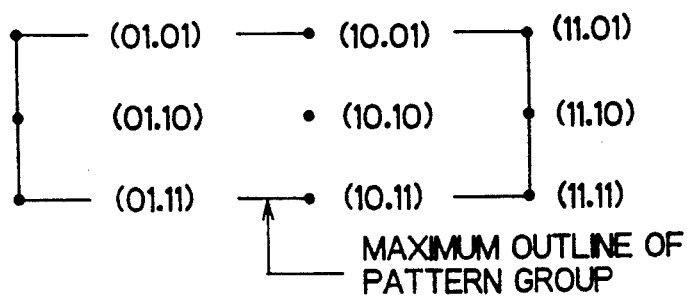
FIG. 9 is a schematic diagram for a mode data of the data stored in the ROM.
FIG. 10 is a schematic diagram for a reference position data of the mode data stored in the ROM.

As shown in FIG. 9, the mode data 55 for each of the pattern groups 0-3 includes a data of 8 bits. A value of each bit represents a corresponding one of various kinds of settings for the sewing operation of the pattern group. For example, a bit 61 for needle location at the upper left corner of the pattern group and a bit 63 for needle location at the upper right corner of the pattern group represent a first needle locating position for a sewing operation for the pattern group. (Accordingly, the bit 61 and the bit 63 correspond to the position-relevant data.) In this embodiment, the bit 61 for the needle location at the upper left corner is set to a logic "1" for a pattern group in which plural patterns are aligned laterally (for example, an array of laterally-aligned characters). The bit 63 for the needle location at the upper right corner is set to a logic "1" for a pattern group in which plural patterns are aligned vertically (for example, an array of vertically-aligned characters).

An X-coordinate value 65 and a Y-coordinate value 67 for a reference position of the mode 55 of each of the pattern groups 0-3 represent a reference position (corresponding to the position-relevant data) determined inside or outside of the each pattern group concerned. Each of the X-coordinate value 65 and the Y-coordinate value 67 is represented with two bits. As shown in FIG. 10, the X-coordinate value 65 and the Y-coordinate value 67 are combined to specify any one of nine positions which include eight positions on the periphery of the maximum-size outline of the pattern group and the center position of the pattern group, as the reference position of the pattern group. This reference position will be used to carry out a calculation processing as will be described later for combining the pattern group with another pattern group.

Figure 19A:
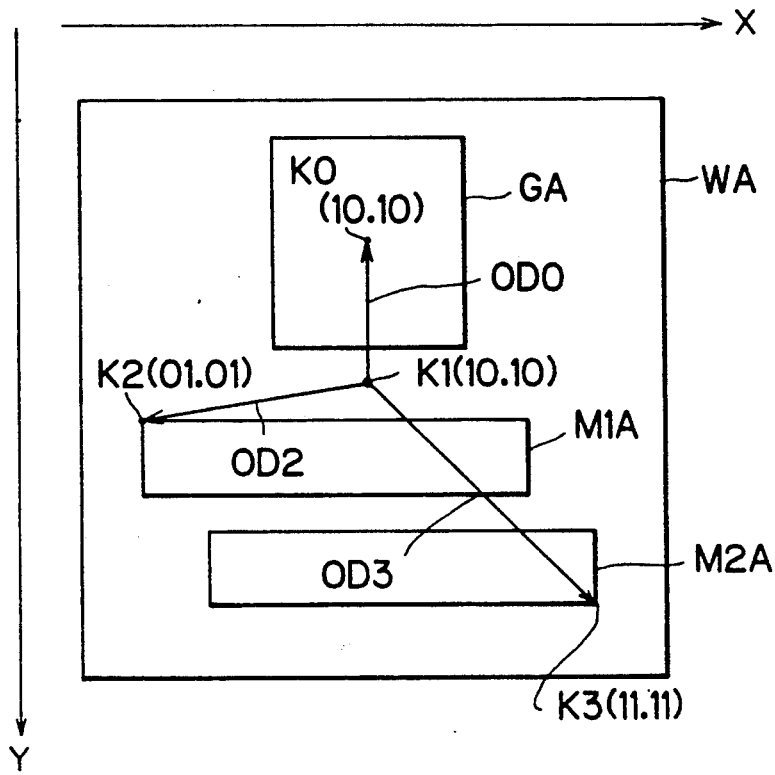
FIG. 19(A) illustrates examples of the reference positions of each of the figure pattern, the frame pattern and the first and second character line patterns and the (X)- and (Y) offset data 57 and 59 therefor.

For example, in the case where a center position of a maximum size outline of a frame pattern WA (pattern group 1) is determined as a reference position K1 for the frame pattern WA, as shown in FIG. 19(A), the reference position K1 is represented by the 2-dimensional value of (10, 10). Accordingly, the X-coordinate value 65 and the Y-coordinate value 67 for the reference position (10, 10) of the frame pattern WA are respectively set to 10 and 10. Similarly, in the case where a center position of a maximum size outline of a figure pattern GA (pattern group 0) is determined as a reference position K0 for the figure pattern GA, since the reference position K0 is represented by the 2-dimensional value of (10, 10), the X-coordinate value 65 and the Y-coordinate value 67 for the reference position (10, 10) of the figure pattern GA are respectively set to 10 and 10. In the case where an upper-and-left corner position of a maximum size outline of a first line character pattern M1A (pattern group 2) is determined as a reference position K2 for the first line character pattern M1A, the reference position K2 is represented by the 2-dimensional value of (01, 01). Accordingly, the X-coordinate value 65 and the Y-coordinate value 67 for the reference position (01, 01) of the first line character pattern group M1A are respectively set to 01 and 01. In the case where a lower-and-right corner position of a maximum size outline of a second line character pattern M2A (pattern group 3) is determined as a reference position K3 for the second line character pattern group M2A, the reference position K3 is represented by the 2-dimensional value of (11, 11). Accordingly, the X-coordinate value 65 and the Y-coordinate value 67 for the reference position (11, 11) of the second line character pattern group M2A are respectively set to 11 and 11.

The following table 1 shows an example of the 8-bit mode data 55.

TABLE 1

| BIT NUMBER | EXAMPLE | MEANING |
| --- | --- | --- |
| 7 | 1 | FRAME PATTERN |
| 6 | 1 | STOP |
| 5 | 0 | NOT LOCATE |
| 4 | 0 | NOT LOCATE |
| 3 | 1 | X CENTER |
| 2 | 0 | X CENTER |
| 1 | 1 | Y CENTER |
| 0 | 0 | Y CENTER |

Figure 18B:
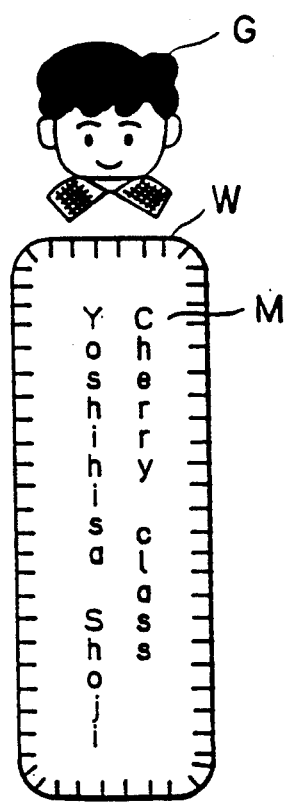

The lateral(X)-direction offset data 57 and the vertical(Y)-direction offset data 59 which are also determined for each of the pattern groups 0-3 define with respect to each frame pattern define (or represent) a relative (combination) position of the each pattern group with respect to the each frame pattern (i.e., correspond to a position-relevant data). More specifically to say, the (X)-direction and (Y)-direction offset data 57 and 59 represent an offset amount between the above-described reference position of the each frame pattern and the above-described reference position of each of the pattern groups 0-3 to be combined with the each frame pattern. For example, as shown in FIG. 18(A), the offset data 57 and 59 allow a figured pattern G to be located at a predetermined position inside of the frame pattern W. As shown in FIG. 18(B), the offset data 57 and 59 allow a figured pattern G to be located at a predetermined position outside of the frame pattern W.

More specifically to say, for example, it is now assumed that the frame pattern WA should be combined with the figure pattern GA (pattern group 0), the first line character pattern M1A (pattern group 2) and the second line character pattern M2A (pattern group 3), as shown in FIG. 19(A). In this example, X- and Y-components of a vector OD0 directed from the reference position K1 toward the reference position K0 correspond to the lateral(X)- and vertical(Y)-offset data 57 and 59 for the pattern group 0 with respect to the frame pattern WA (frame i; $1 \leq i \leq j$). Similarly, X- and Y-components of a vector OD2 directed from the reference position K1 toward the reference position K2 correspond to the lateral(X)- and vertical(Y)-offset data 57 and 59 for the pattern group 2 with respect to the frame pattern WA (frame i; $1 \leq i \leq j$). X- and Y-components of a vector OD3 directed from the reference position K1 toward the reference position K3 correspond to the lateral(X)- and vertical(Y)-offset data 57 and 59 for the pattern group 3 with respect to the frame pattern WA (frame i; $1 \leq i \leq j$).

The maximum number data of the character patterns 47 represents the already-described maximum number of the character patterns which can be combined with each of the plural frame patterns (which corresponds to a position-relevant data). More specifically to say, the maximum number data includes the maximum number data of the character patterns arrangeable for forming the first character line M1 and the maximum number data of the character patterns arrangeable for forming the second character line M2.

Figure 18C:

The data of character pattern aligned direction 49 represents the alignment direction along which the character patterns are to be aligned to be combined with each of the plural frame patterns. That is, the data 49 represents that the first and second character lines M1 and M2 should extend vertically or laterally to be combined with each of the frame patterns W, and therefore corresponds to another position-relevant data. With the maximum number of the character patterns 47 and the character pattern aligned direction data 49, in the name tag as shown in FIG. 18(A), for example, the character patterns having the number which is equal to or lower than the maximum number are laterally aligned to form two laterally-extending arrays. On the other hand, in the name tag as shown in FIG. 18(B), the character patterns having the number which is equal to or lower than the maximum number are vertically aligned to form two vertically-extending arrays. In the name tag as shown in FIG. 18(C), the character patterns having the number which is equal to or lower then the maximum number are laterally aligned to form two laterally-extending arrays.

For example, in the case where the first and second character lines M1A and M2A to be combined with the frame pattern WA should extend laterally, as shown in FIG. 19(A), the data 49 set for the frame pattern WA (frame i: $1 \leq i \leq j$) represents that the frame pattern should be combined with the character lines extending laterally. The number of the character patterns to be aligned for forming the first character line M1A should be equal to or lower than the maximum number data 47 set for the frame pattern WA (frame i: $1 \leq i \leq j$). Similarly, the number of the character patterns to be aligned for forming the second character line M2A should be equal to or lower than the maximum number data 47 set for the frame pattern WA (frame i: $1 \leq i \leq j$).

A sewing operation of the sewing machine equipped with the pattern data processing device will be hereunder described.

First, an operator selects a name tag sewing mode through his or her manipulation of the name tag sewing mode key 10, and then pushes down the start key. The operator then inserts the figured-pattern card 13B into the card inserting inlet and manipulates the pattern selecting key group 9 to input an identification number representing his or her desired figured-pattern G while watching the display area 15B of the figured-pattern card 13B which is being inserted in the card inserting inlet. Then, the operator inserts the frame pattern card 13C into the card inserting inlet, and manipulates the pattern selecting key group 9 to input an identification number representing a desired frame pattern W while watching the display area 15C. The operator then inserts the character pattern card 13D into the card inserting inlet, and manipulates the pattern selecting key group 9 to input an identification number representing a desired character M while watching the display area 15D. When the desired character M includes plural characters, the identification numbers of all the plural characters are input in the aligning order of the characters. When the characters are required to be formed over two lines, an end key is pushed down after when the input operation for the characters of the first line is completed, and then characters for the second line are inputted. The characters which are thus inputted after the manipulation of the end key are recognized as characters for a character array of the second line, as will be described later. When the selection of all the desired patterns are completed, the end key is pushed down again. Upon pushing down the end key again, the sewing machine 1 is changed from the input mode to the sewing operation execution mode.

The various processings are executed by the CPU 23, based on the above-described operator's manipulations, as described hereinafter.

First, the CPU 23 repetitively executes the pattern-selecting processing routine (FIG. 11) at predetermined timings after when the operator selects the name tag sewing mode.

In the pattern-selecting processing routine, the CPU 23 judges whether or not the operator manipulates the keys (Step S100). If the key manipulation is not judged ("No" at the step S100), the program goes to a return step to execute a main routine again, that is, the CPU is transferred to a key manipulation standby state. If the key manipulation is carried out ("Yes" at the step S100), it is judged whether or not the start key is pushed (step S110). Since the operator pushes down the start key after selecting the name tag sewing mode as described above, the CPU 23 judges that the key manipulation on the start key is carried out ("Yes" at the step S110). The CPU 23 then sets a figured-pattern mode (step S120), and the program goes to the return step to execute the main routine again.

Subsequently, the operator inputs the identification number for the desired figured-pattern G, as described already. When the CPU detects this operator's key manipulation ("Yes" at the step S100), the CPU judges that this key manipulation is not carried out for the start key ("No" at the step S110), and further judges whether or not the key manipulation is carried out on the end key (step S130). In this case, the CPU judges that the key manipulation is not carried out on the end key ("No" at the step S130), and then judges whether or not the number of selected patterns is equal to or lower then a preset value (step S140). The preset value is defined as the number of patterns of a single kind which can be combined into a single pattern group. The preset value has therefore a value of "1", both in the figured-pattern mode and in the frame pattern mode, since only a single figure pattern G and only a single frame pattern W can be used for each name tag. In the first-line character mode and in the second-line character mode, on the other hand, the preset values have such values as represented by the maximum character pattern numbers 47 for the first and second character lines stored in the ROM 25 for the selected frame pattern W.

If the number of the inputted patterns is judged to be greater than the preset value ("no" at the step S140), an error processing (step S210) is executed. In this case, however, the number of the inputted patterns is judged to be equal to the preset value (value "1"), since only a single figured-pattern G has been inputted ("Yes" at the step S140). Then, the value (identification number of the selected pattern) inputted through the key manipulation is converted into a pattern number (S150) representative of the selected pattern. More specifically to say, the detection switches A and B indicate that the card now inserted in the card-inserting inlet is the figured-pattern card 13B. In addition, the figured-pattern mode is now selected. Accordingly, the CPU 23 extracts the pattern number corresponding to the inputted value (identification number of the selected pattern), with reference to a data table which includes a plurality of pattern numbers indicative the plural figured-patterns G and which is beforehand stored in the ROM 25. Subsequently, the extracted pattern number representative of the selected figured pattern G is stored at the head position (a combination position No. 0) in a buffer 1 which is formed at a predetermined region of the RAM 27 (S160), as shown in FIG. 16.

Thereafter, the CPU 23 judges whether or not the selected mode is the figured-pattern mode (step S170). In this case, since the CPU judges the selected mode to be the figured-pattern mode ("Yes" at the step S170), the CPU sets the frame mode (S180), and the program goes to the return step to execute the main routine again.

After when the operator selects the desired figured-pattern G, the operator then inserts the frame pattern card 13C into the card inserting inlet and manipulates the key group 9 to input the identification number of the desired frame pattern W, as described already. Upon detection of this key manipulation ("Yes" at the step S100), the CPU 23 judges that this key manipulation is carried out on neither the start key nor the end key ("No" at the step S110 and "No" at the step S130). Then the CPU judges whether or not the number of patterns of a single kind (single pattern group) inputted through the key manipulation is equal to or lower than the preset value (S140). Since this key manipulation is carried out to first input a frame pattern W, the number of the inputted patterns is judged to be equal to the preset value (value "1") ("Yes" at the step S140). Then, the value (identification number of the selected pattern) inputted through the key manipulation is converted into the pattern number (S150). More specifically, the detection switches A and B indicate that the card now inserted in the card-inserting inlet is the frame-pattern card 13C. In addition, the frame-pattern mode is now selected. Accordingly, a pattern number corresponding to the inputted value (identification number of the selected pattern) is extracted, with reference to the data table which includes a plurality of pattern numbers indicative of the plural frame patterns W and which is beforehand stored in the ROM 25. The pattern number for the selected frame pattern W is then stored in the buffer 1 at a position (a combination position No. 1) just behind the position where the pattern number for the selected figured-pattern G has been stored, as shown in FIG. 16.

Thereafter, the CPU 23 judges that the now selected mode is not the figured-pattern mode ("No" at a step S170), and further judges whether or not the now selected mode is the frame mode (step S190). In this case, the now selected mode is judged to be the frame mode ("Yes" at a step S190). Then, the CPU 23 sets a first-line character mode (step S200), and the program goes to the return step to execute the main routine again.

Next, the operator inserts the character-pattern card 13D into the card inserting inlet, and manipulates the key group 9 to successively input the identification numbers for the respective characters constituting the desired character array of the first line, as described already. When the CPU 23 detects the key manipulation operation ("Yes" at the step S100), the CPU 23 judges that this key manipulation is not carried out on neither the start key nor the end key ("No" at the step S110 and "No" at the step S130), and then judges whether or not the number of the character patterns of the pattern group (the first line character array group) inputted through the key manipulation is equal to or lower then the preset value (step S140), where the preset value is defined as a value of the number of characters patterns which may be aligned on the first line and which is represented by the maximum number 47 of the character patterns determined for the selected frame pattern W.

If the CPU 23 judges the number of the inputted character patterns of the pattern group to be equal to or lower than the preset value ("Yes" at the step S140), the values (identification numbers for the selected patterns) inputted through the key manipulation are converted to the corresponding pattern numbers (step S150). More specifically to say, the detection switches A and B indicate that the card now inserted in the card-inserting inlet is the character-pattern card 13D. In addition, the character-pattern mode is now selected. Accordingly, pattern numbers for the character patterns M corresponding to the inputted values are extracted, with reference to the data table which includes a plurality of numbers indicative of the plural character patterns M and which is beforehand stored in the ROM 25. Thereafter, the pattern numbers of the extracted character patterns M are successively stored in the buffer 1, from the position (combination position No. 2) just behind the position where the pattern number of the selected frame pattern W has been stored, in the order that the combination position number may be increased (S160). Then, the CPU judges that the selected mode is neither the figure mode nor the frame mode ("No" at the step S170 and "No" at the step S190), the program goes to the return step to execute the main routine again.

Accordingly, the CPU 23 stores the pattern numbers of the operator's selected character patterns M into the buffer 1 one by one in the order that the operator selects the character patterns M. If the number of the characters selected by the operator exceeds the preset value (the maximum character number of the character array of the first line determined for the selected frame pattern), the CPU 23 judges that the number of the selected characters to exceed the preset value ("No" at the step S140) and then executes the error processing to alarm the operator by the beep sound, (step S210).

The operator pushes the end key when the key manipulation for inputting the first-line character array is completed. Upon detection of the manipulation of the end key ("Yes" at the step S130), the CPU 23 judges whether or not the selected mode is the first-line character mode (step S220). In this case, since the CPU judges that the selected mode is the first-line character mode ("Yes" at the step S220), the CPU stores the number of the characters inputted for the first line into a predetermined region of the RAM 27 (step S230). Thereafter, the CPU sets the second-line character mode (step S240), and the program goes to the return step to execute the main routine again.

The operator then successively inputs the characters for the second-line character array, immediately after when he or she manipulates the end key, as described already. The CPU 23 repeats the same processing as the above-described successively-storing operation of the pattern numbers which correspond to respective ones of the identification numbers of the characters inputted for the first-line character array, to thereby successively store into the buffer 1 the pattern numbers corresponding to the characters of respective ones of the characters inputted for the second-line character array (step S160). During this operation, the CPU 23 judges whether or not the number of the inputted characters of the pattern group (second-line character array) is equal to or lower then the preset value (the value of the maximum number of the character patterns to be aligned in the second line which is represented by the maximum number of the character patterns 47 determined for the selected frame pattern W) (step S140). If the number of inputted characters exceeds the preset value, an error processing is carried out (step S210).

When the operator's input operation of the characters for the second-line array is completed, or in the case where the input operation of the first-line character is completed and the second-line character array is not required to be inputted, the operator pushes the end key again, since the whole input operation of the patterns are completed. Upon detection of the manipulation of the end key ("Yes" at the step S130), the CPU judges that the selected mode is not the first-line character mode ("No" at the step S220). The CPU then stores the number of the character patterns inputted for the second line, in a predetermined region of the RAM 27 (step S250), and then the program goes to the return step to stop the execution of the main routine.

Through the execution of the pattern selection processing routine (FIG. 11) as described above, the pattern numbers indicative of the selected patterns are aligned to be stored in the buffer 1 (FIG. 16) in the selecting order thereof. An end code FF indicative of the end of data is provided at the last position of the data.

After when the pattern selection processing routine is thus completed, the CPU executes a sewing data formation processing routine (as shown in FIGS. 12, 13, 14 and 15) for forming sewing data with which a name tag including a composite of the selected figured-pattern G, frame pattern W and character arrays M will be produced.

Figure 12:
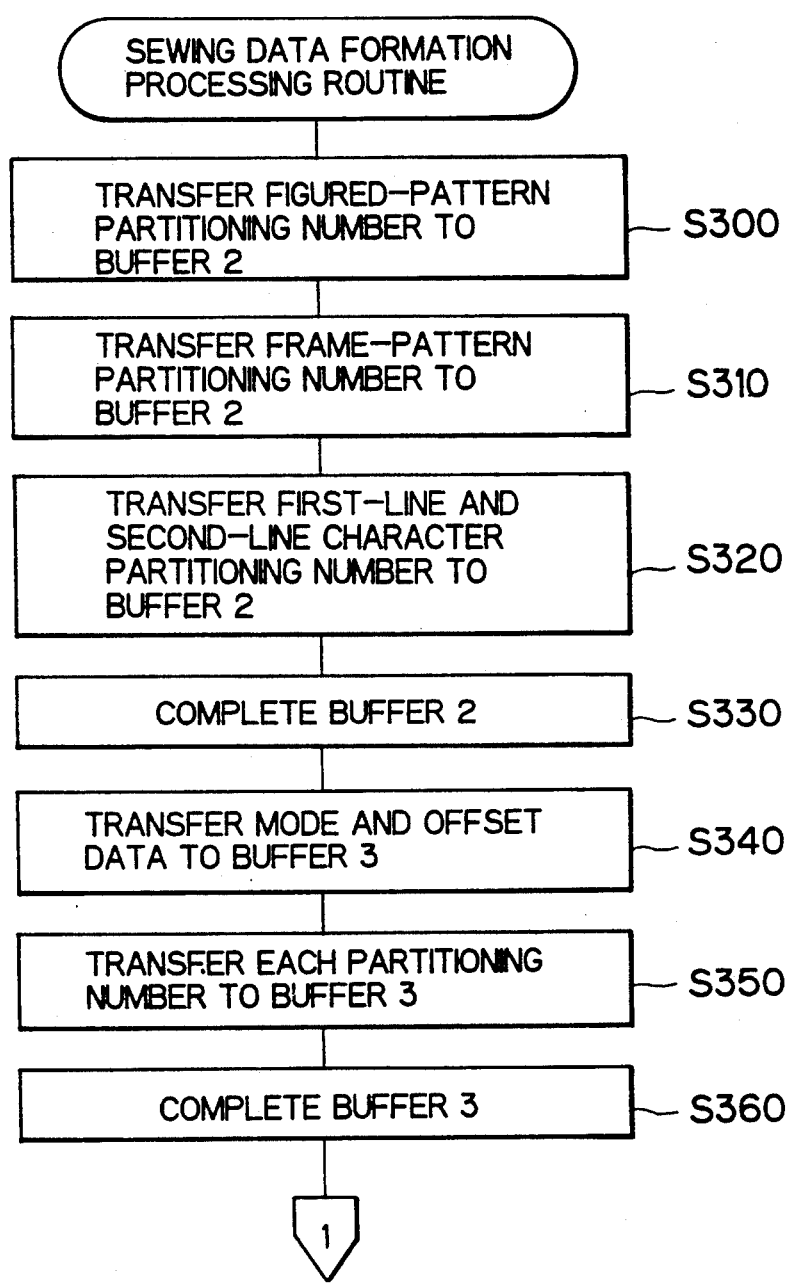
FIG. 12 is a flowchart for a part of a sewing data formation processing routine which is executed by the CPU.
Figure 17:
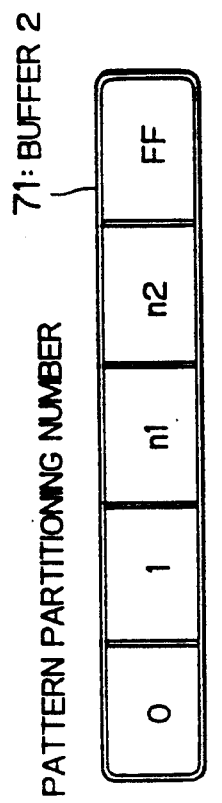
FIGS. 17(A), 17(B), 17(C) and 17(D) are schematic diagrams showing the memory construction of buffers 2, 3, 4 and 5.
Figure 17:
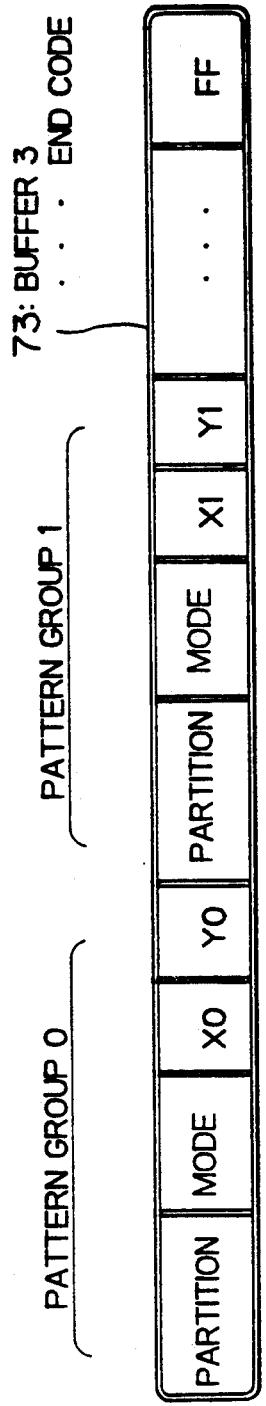
Figure 17:
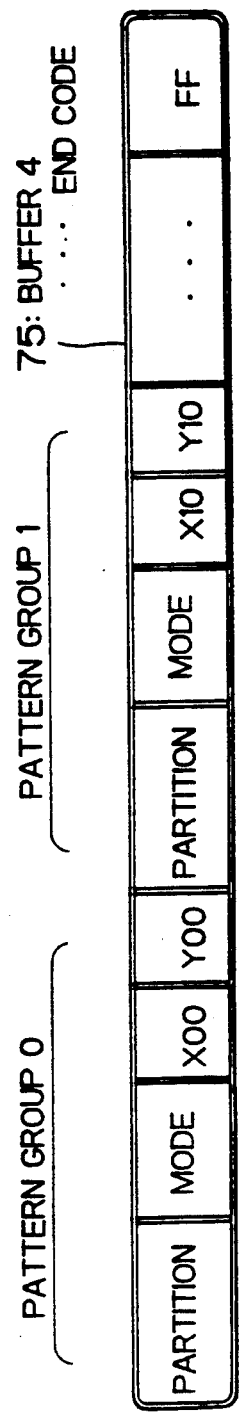
Figure 17:
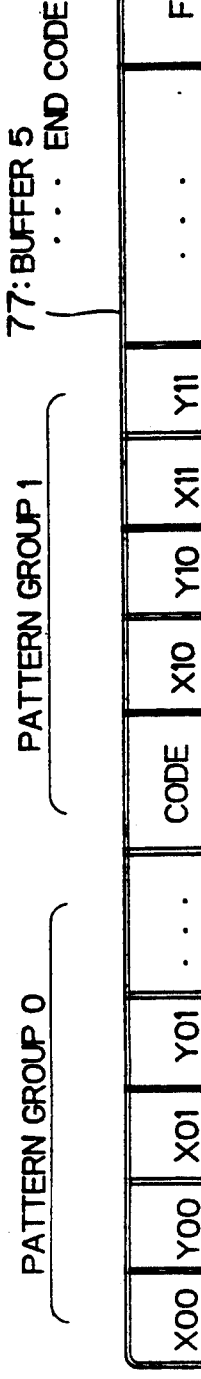

When the sewing data formation processing routine is started, the CPU 23 successively transfers a figured-pattern partitioning number, a frame number partitioning number, a first-line character partitioning number and a second-line character partitioning number to a buffer 2 in this order (steps S300, S310 and S320) as shown in FIG. 12. The partitioning numbers are represented by the combination position numbers indicative of partition positions between the respective two adjacent pattern groups (the figured pattern G, the frame pattern W, the first-line character array, and the second-line character array) arranged in the buffer 1. In this embodiment, since each of the figured pattern G and the frame pattern W constitutes one pattern group with a single pattern, the partition numbers "0" and "1" are assigned to the pattern groups of the figured pattern G and the pattern group of the frame pattern W, respectively. As a partition number for each of the first-line character array and the second-line character array, the combination position number of the last character of the character array of each line is used. Through this operation, as shown in FIG. 17(A), the partition numbers are stored in the buffer 2 (reference numeral 71). The CPU 23 transfers the end code FF to the last position of the buffer 2 and then completes the data transfer operation into the buffer 2 (step S330).

Thereafter, the CPU 23 reads out from the ROM 25 the name-tag pattern group arrangement data 45 for the operator selected frame pattern W, to thereby transfer to a buffer 3 the mode data 55 and the (X)- and (Y)-offset data 57 and 59 for the pattern groups 0 to 3 for the selected frame pattern W (step S340). Then, the partition numbers of the respective pattern groups stored in the buffer 2 are transferred to the buffer 3 (step S350). Then, as shown in FIG. 17(B), the CPU 23 stores the partitioning numbers, the mode data 55 and the (X) and (Y) offset data 57 and 59 into the buffer 3 (reference numeral 73) for each of the pattern groups 0 to 3. The CPU 23 then transfers the end code FF to the last position of the buffer 3 to complete the data transfer operation into the buffer 3 (step S360).

Figure 13:
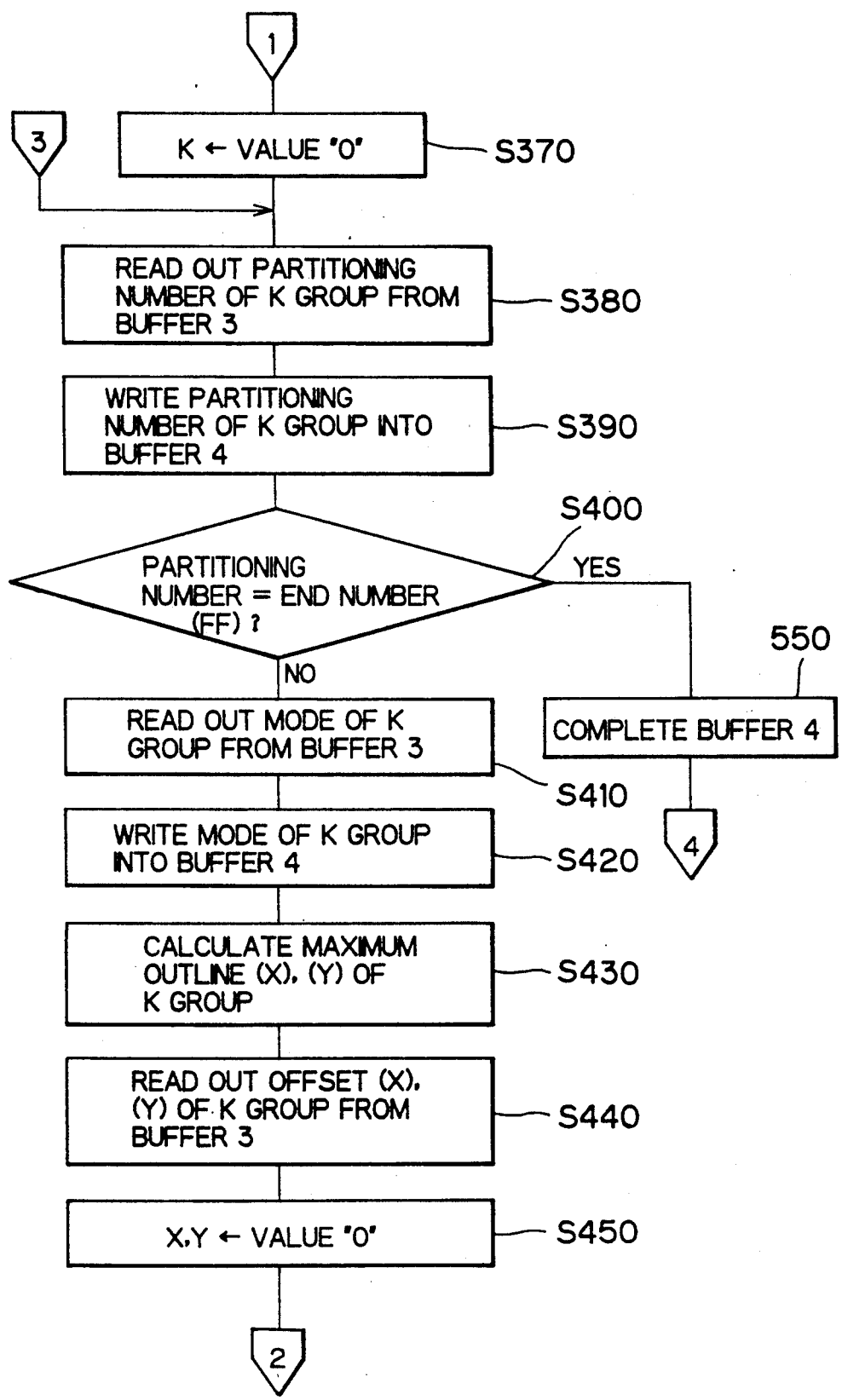
FIG. 13 is a flowchart for another part of the sewing data formation processing routine.
Figure 14:
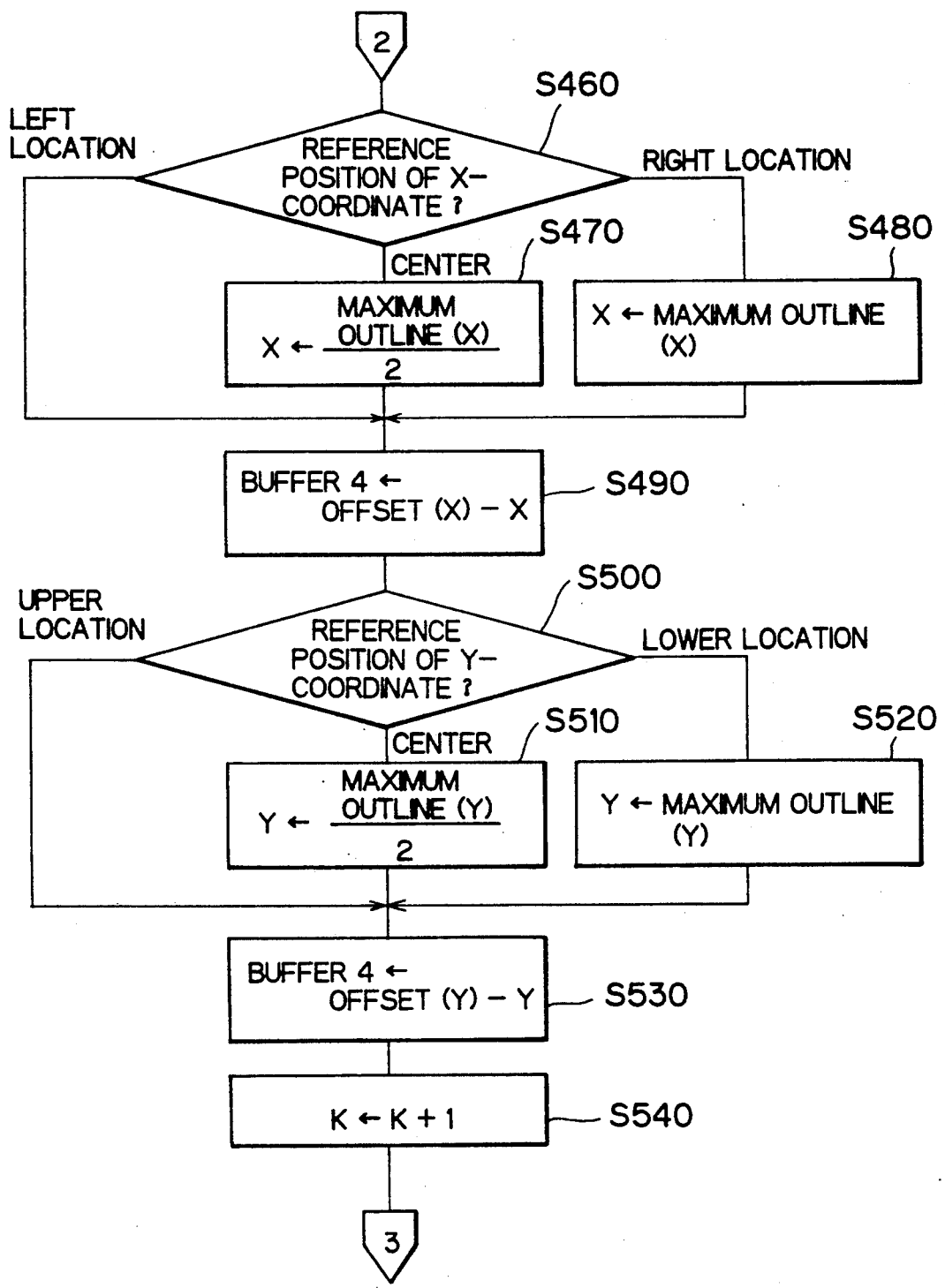
FIG. 14 is a flowchart for still another part of the sewing data formation processing routine.

After when the data transfer operation to the buffer 3 is completed as described above, the program proceeds to a buffer 4 forming processing routine as shown in flowcharts of FIGS. 13 and 14.

First, the CPU 23 sets a variable K to "0" (step S370). The CPU 23 reads out, from the buffer 3, the partitioning number of a pattern group K specified by the set variable K (step S380). Then, the CPU writes the partitioning number of the pattern group K into a buffer 4 (step S390). Thereafter, the CPU 23 judges whether or not the read-out partitioning number is the end code FF (step S400). The processing described below is repeated until when the partitioning number is judged to be the end code ("No" at a step S400).

First, the CPU 23 reads out the mode data 55 for the pattern group K from the buffer 3 (step S410), and stores the thus read-out mode 55 into the buffer 4 (step S420). Thereafter, the maximum outline size (the size of (X) and (Y) components) of the pattern group K is calculated (step S440). In the case where the pattern group K is the figured pattern G (pattern group 0) or the frame pattern W (pattern group 1), since only a single pattern exists within the pattern group, the maximum outline size is calculated from a pattern size data 51 of the pattern data 43 for the selected figured pattern G or the selected frame pattern W. In the case where the pattern group K includes the first-line character array (pattern group 2) or the second-line character array (pattern group 3), the maximum outline size is calculated based on the pattern size data 51 of the respective ones of the character patterns of the corresponding character array (first-line character array or second-line character array).

Next, the CPU 23 reads out the (X) and (Y) offset data 57, 59 of the pattern group K from the buffer 3 (step S440). The CPU then sets variables X and Y indicative of correction amounts for the offset data 57 and 59 both to "0" (step S450).

It is noted that the (X)-coordinate value 65 in the mode data 55 of the pattern group K which is read out at the step S410 indicates that the reference position of the pattern group K is located on either one of left, center and right columns which are formed inside or on the outline of the pattern group K by the nine positions arranged as shown in FIG. 10. More specifically to say, the X coordinate value 65 indicates that the reference position is either one of any one of three portions aligned vertically at the left side, any one of three portions aligned vertically at the center side, and any one of three portions aligned vertically at the right side. Accordingly, the CPU judges, based on the X coordinate value, which one of the left, center and right columns is provided with the reference position (step S460). If the reference position is located on the left column ("LEFT LOCATION" at the step S450), the variable X remains to be "0". If the reference position is located on the center column ("CENTER LOCATION" at the step S450), a value obtained by dividing the (X) component of the maximum outline size calculated at the step S430 by a value "2" is set to the variable X (step S470). If the reference position is located on the right column ("RIGHT LOCATION" at the step S450), the (X) component of the maximum outline size is set to the variable X (step S480). Then, a value obtained by subtracting the variable X from the (X) offset data 57 is transferred to the buffer 4 as a corrected offset data $(X_{n0})$ (step S490).

Similarly, it is noted that the Y coordinate value 67 in the mode data 55 of the pattern group K which is read out at the step S410 indicates that the reference position of the pattern group K is located on either one of the upper, center and lower lines which are formed inside or on the outline of the pattern group K by the nine positions arranged as shown in FIG. 10. More specifically to say, the Y coordinate value 67 indicates that the reference position is either one of any one of three portions aligned laterally at the upper side, any one of three portions aligned laterally at the center side, and any one of three portions aligned laterally at the lower side. Accordingly, the CPU judges, based on the Y coordinate value 67, which one of the upper, center and lower lines is provided with the reference position 67. If the reference position is located on the upper line ("UPPER LOCATION" at the step S500), the variable Y remains to be "0". If the reference position is located on the center line ("CENTER LOCATION" at the step S500), a value obtained by dividing the (Y) component of the maximum outline size calculated at the step S430 by a value "2" is set to the variable Y (step S510). If the reference position is located on the lower line ("LOWER LOCATION" at the step S500), the (Y) component of the maximum outline size is set to the variable Y (step S520). Then, a value obtained by subtracting the variable Y from the (Y) offset data 59 is transferred to the buffer 4 as a corrected offset data $(Y_{n0})$ (step S530).

Through the above-described operation, as shown in FIG. 17(C), the partitioning number, the mode data 55, and the corrected offset data $(X_{n0})$ and $(Y_{n0})$ for the pattern group K are arranged in the buffer 4 (reference numeral 75).

Thereafter, the variable K is incremented (step S540), and the program goes to the step S380 as shown in FIG. 13. Subsequently, the processings at the steps S380 to S540 are repeated until when the partitioning number of the pattern group K reaches the end code FF. When the partitioning number of the pattern group K reaches the end code FF ("Yes" at the step S400), the CPU transfers the end code FF to the last position of the buffer 4, to thereby complete the data transfer operation to the buffer 4 (step S550).

In the buffer 4 into which the data have been thus transferred, the mode data 55 and the offset data $(X_{n0})$ and $(Y_{n0})$ for each of the pattern groups 0 to 3 are arranged in the order of the pattern groups 0 to 3, as shown in FIG. 17(C).

Thus obtained offset data $(X_{n0})$ and $(Y_{n0})$ will be described with reference to the example shown in FIGS. 19(A) and 19(B). In the example, since the figure pattern GA corresponds to the pattern group 0, the offset data $(X_{n0})$ and $(Y_{n0})$ obtained for the pattern group 0 represent X- and Y-components of a vector OL0 directed from the reference position K1 of the frame pattern WA toward the left-and-upper corner position L0 of the figure pattern GA (pattern group 0). Similarly, since the frame pattern WA corresponds to the pattern group 1 (K=1), the offset data $(X_{n0})$ and $(Y_{n0})$ obtained for the pattern group 1 represent X- and Y-components of a vector OL1 directed from the reference position K1 of the frame pattern WA toward the left-and-upper corner position L1 of the frame pattern WA (pattern group 1). Similarly, the offset data $(X_{n0})$ and $(Y_{n0})$ obtained for the pattern group 3 (the second character line M2A) represent X- and Y-components of a vector OL3 directed from the reference position K1 of the frame pattern WA toward the left-and-upper corner position L3 of the second character line pattern M2A (pattern group 3). It should be noted that the offset data $(X_{n0})$ and $(Y_{n0})$ obtained for the pattern group 2 (the first character line M1A) represent X- and Y-components of a vector OL2 (i.e., the vector OD2) directed from the reference position K1 of the frame pattern WA toward the left-and-upper corner position L2 (that is, the reference position K2) of the first character line pattern M1A (pattern group 2).

Thus, the offset data $(X_{n0})$ and $(Y_{n0})$ have been obtained by correcting the (X) and (Y) offset data 57 and 59 which represent a relative offset amount between the reference positions of the frame pattern and pattern group K to be combined with the frame pattern, on the basis of the maximum outline size and the reference position of the pattern group K which consists of the actually-selected patterns. The offset data $(X_{n0})$ and $(Y_{n0})$ indicate a relative offset amount defined between the left-and-upper corner of the maximum outline of a pattern group (K) and an absolute point of the reference position of the frame pattern (pattern group 1).

It should be further noted that it is apparent that it is possible to easily calculate another pair of offset data $(X_{n0})'$ and $(Y_{n0})'$ representing a relative offset amount defined between the right-and-lower corner of the maximum outline of each pattern group (K) and an absolute point of the reference position of the frame pattern (pattern group 1).

Figure 19B:
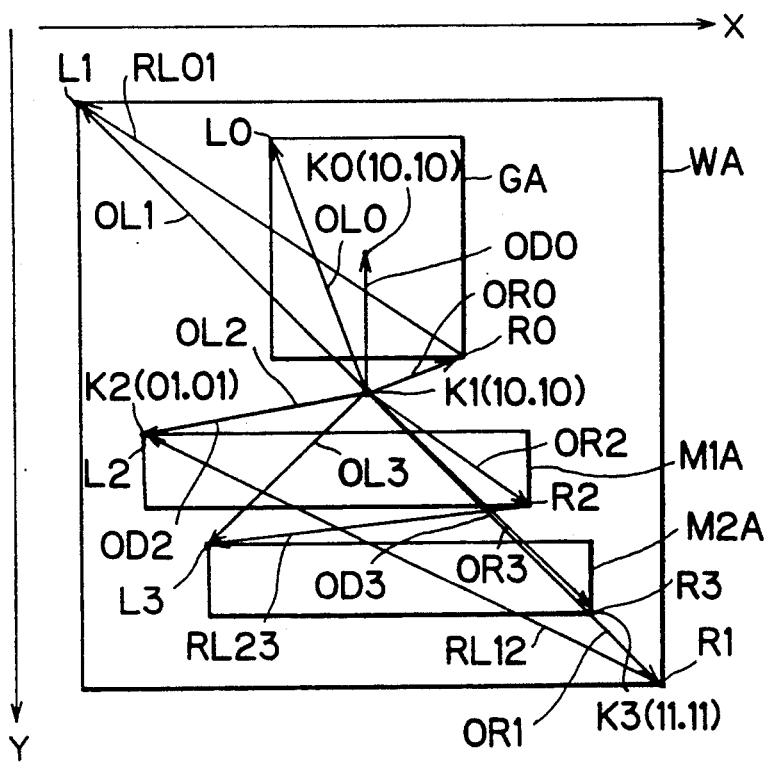
FIG. 19(B) illustrates examples of the corrected (X)- and (Y)-offset data $(X_{n0})$, $(Y_{n0})$, $(X_{n0})'$, $(Y_{n0})'$, and $(X_{n0})''(Y_{n0})''$.

For example, as shown in FIG. 19(B), it is apparent that it is possible to easily calculate another pair of offset data $(X_{n0})'$ and $(Y_{n0})'$ for the figure pattern GA (pattern group 0) representing X- and Y-components of a vector OR0 directed from the reference position K1 of the frame pattern WA toward the right-and-lower corner position R0 of the figure pattern GA through processings similar to the above described steps S460 through 520. Similarly, it is possible to easily calculate another pair of offset data $(X_{n0})'$ and $(Y_{n0})'$ for the frame pattern WA (pattern group 1) representing X- and Y-components of a vector OR1 directed from the reference position K1 of the frame pattern WA toward the right-and-lower corner position R1 of the frame pattern WA, another pair of offset data $(X_{n0})'$ and $(Y_{n0})'$ for the first character line pattern M1A (pattern group 2) representing X- and Y-components of a vector OR2 directed from the reference position K1 of the frame pattern WA toward the right-and-lower corner position R2 of the pattern M1A, and another pair of offset data $(X_{n0})'$ and $(Y_{n0})'$ for the second character line pattern M2A (pattern group 3) representing X- and Y-components of a vector OR3 directed from the reference position K1 of the frame pattern WA toward the right-and-lower corner position R3 (reference position K3) of the pattern M2A.

In this case, the offset data $(X_{n0})$ and $(Y_{n0})$ for the figure pattern GA (pattern group 0) may be set as a new pair of offset data $(X_{n0})''$ and $(Y_{n0})''$ therefor. As a new pair of offset data $(X_{n0})''$ and $(Y_{n0})''$ for the frame pattern WA (pattern group 1), a value obtained by subtracting the data $(X_{n0})'$ for the figure pattern GA from the data $(X_{n0})$ for the frame pattern WA may be set. (The new pair of offset data $(X_{n0})''$ and $(Y_{n0})''$ for the frame pattern WA therefore represents a new vector RL01 directed from the right-and-lower corner R0 of the figure pattern GA toward the left-and-upper corner L1 of the frame pattern WA.) Similarly, as a new pair of offset data $(X_{n0})''$ and $(Y_{n0})''$ for the first character line pattern M1A (pattern group 2), a value obtained by subtracting the data $(X_{n0})'$ for the frame pattern WA from the data $(X_{n0})$ for the first character line pattern M1A may be set. (The new pair of offset data $(X_{n0})''$ and $(Y_{n0})''$ for the pattern M1A therefore represents a new vector RL12 directed from the right-and-lower corner R1 of the frame pattern WA toward the left-and-upper corner L2 of the first character line pattern M1A.) As a new pair of offset data $(X_{n0})''$ and $(Y_{n0})''$ for the second character line pattern M2A (pattern group 3), a value obtained by subtracting the data $(X_{n0})'$ for the first character line pattern M1A from the data $(X_{n0})$ for the second character line pattern M2A may be set. (The new pair of offset data $(X_{n0})''$ and $(Y_{n0})''$ for the pattern M2A therefore represents a new vector RL23 directed from the right-and-lower corner R2 of the first character line pattern M1A toward the left-and-upper corner L3 of the second character line pattern M2A.)

Thus calculated new offset data $(X_{n0})''$ and $(Y_{n0})''$ for the respective pattern groups 0 through 3 may be transferred to the buffer 4, in place of the offset data $(X_{n0})$ and $(Y_{n0})$. In this case, the offset data $(X_{n0})''$ and $(Y_{n0})''$ indicate a relative offset amount between the right-and-lower corner of the maximum outline of a pattern group (K−1) which is stored in the buffer just before the pattern group (K) and the left-and-upper corner of the maximum outline of the pattern group (K).

Figure 15:
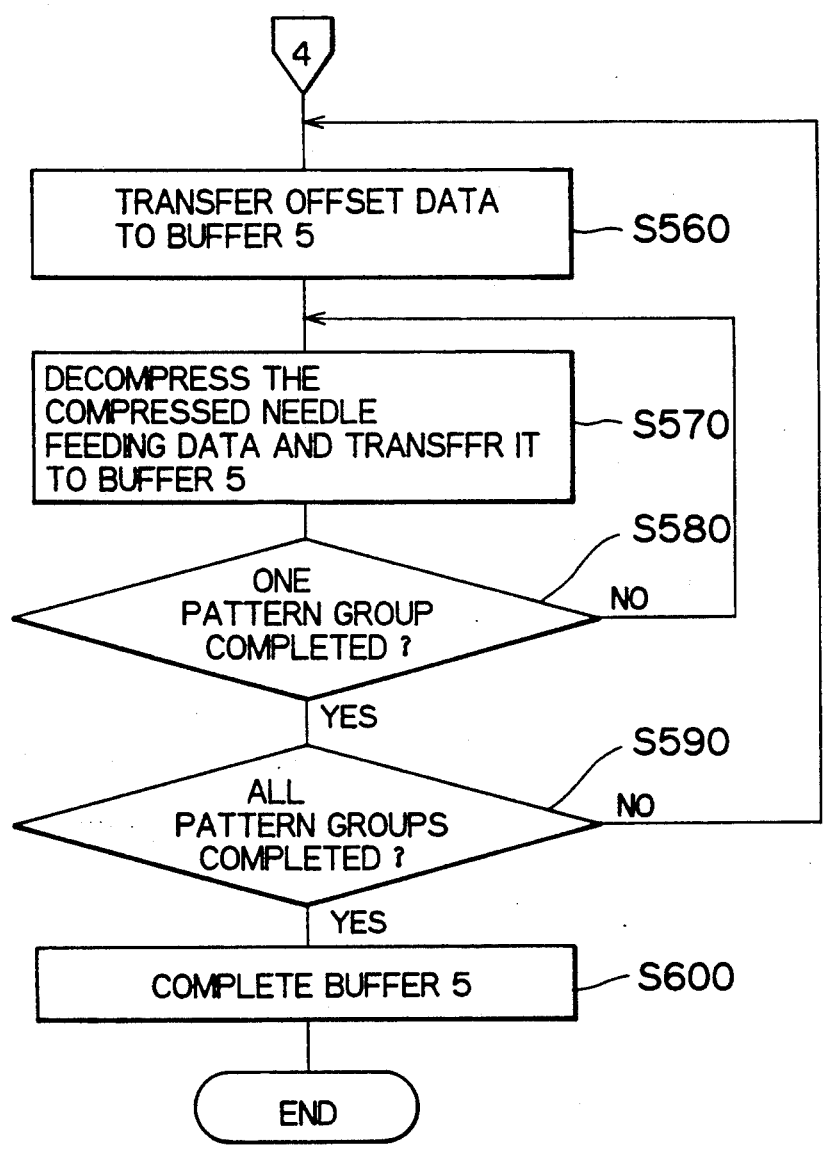
FIG. 15 is a flowchart for a further part of the sewing data formation processing routine.

After when the CPU has completed the data transferring operation into the buffer 4 (step S550), the CPU 23 transfers to the buffer 5 the offset data $(X_{n0})$ and $(Y_{n0})$ (or the offset data $(X_{n0})''$ and $(Y_{n0})''$) of a pattern group positioned at the head position of the buffer 4 to a buffer 5 (step S560) as shown in a flowchart of FIG. 15. Then, the compressed needle feeding data 53 for the respective patterns in the pattern group are read out from the ROM 25. Thus read out compressed needle feeding data 53 are decompressed, and are transferred to the buffer 5 (step S570). Thereafter, it is judged whether or not the processing at the step S570 is completed for all the patterns in the pattern group (step S580). If the processing for the pattern group is judged not to be completed ("No" at the step S580), the processing at the step S570 is repeated.

After when the compressed needle feeding data 53 for all the patterns in the pattern group are decompressed to be transferred to the buffer 5 (step S570), since the CPU judges that the processings for all the patterns of the one pattern group to be completed (step S580), the CPU further judges (step S590) whether or not the processings for all pattern groups are completed. If it is judged that the processings have not yet been completed for all the pattern groups ("No" at the step S590), the program goes to the step S560 to repeat the above-described processing. When the compressed needle feeding data 53 for all patterns of all the pattern groups are decompressed and transferred to the buffer 5 (step S570), the CPU judges that the processings for all the pattern groups are completed (step S590). Then, the CPU transfers the end code FF to the last position of the buffer 5, to thereby complete the data transfer operation to the buffer 5 (step S600). It is noted that in the judgment processing at the step S580, a code indicative of the end of one pattern group is provided in the last position of data of each pattern group in the buffer 5.

Consequently, the needle feeding data $X_{ij}$ and $Y_{ij}$ with which the respective patterns of each pattern group will be successively formed in a sewing operation are stored in the buffer 5 in the order of the pattern groups 0 to 3, as shown in FIG. 17(D).

On the basis of the thus obtained needle feeding data $X_{ij}$ and $Y_{ij}$, the electrical control device controls the sewing mechanism 35 of the sewing machine 1 to control the relative movement between the cloth to be stitched and the sewing needle, thereby forming a desired name tag (as shown in FIG. 18) in which the selected figured pattern G, the selected frame pattern W and the selected character patterns M are combined in a suitable arrangement manner.

According to the sewing machine equipped with the pattern data processing device of this embodiment, as described above, a pattern data for sewing a desired composite pattern including the selected figured pattern G, the selected frame pattern W and the selected character pattern M which are combined at suitable positions relative to one another can be automatically synthesized, on the basis of the pattern group arrangement data 45, the maximum character number 47, the character aligning direction 49, the pattern size data 51, (X) and (Y) offset data 57 and 59, etc. Accordingly, the operator can easily perform a sewing operation of a desired name tag including a combination of selected patterns G, W and M in a suitable arrangement manner, through simply selecting the patterns.

In the case where the reference position represented by the X-coordinate value 65 and the Y-coordinate value 67 of the mode data 55 is set to be positioned at the center of the maximum outline of a pattern group, the center position of the pattern group consisting of selected unit-patterns (character patterns) may substantially coincide with the center position of a forming region which is previously determined inside or outside of the reference pattern (frame pattern), irrespective of the number of the selected unit-patterns. Therefore, according to the sewing machine equipped with the pattern data processing device of this embodiment, as shown in the name tags of FIGS. 18(A) and 18(C) for example, it is possible to locate the character array at the center of a predetermined region of the reference pattern (frame pattern W) with good appearance, irrespective of the number of the unit-patterns.

As shown in the name tags of FIGS. 18(A) and 18(C) for example, the alignment direction (vertical or lateral direction) of the character pattern M is determined on the basis of the character aligning direction data 49. In addition, the alignment starting position (the position of the character "C" in FIG. 18(B) or the alignment ending position (the position of character "i" in FIG. 18(B)) of the character arrays may be determined on the basis of the X-coordinate 65 and the Y-coordinate 67 of the reference position of the mode data 55, the (X) and (Y) offset data 57 and 59, etc. Thus, the arrangement relationship between the character array and the frame pattern W can be determined in accordance with the meaning of the character array.

The present invention is not limited to the above-described embodiment, and various modifications may be made to the above embodiment without departing from the subject matter of the present invention. For example, the present invention may be applied to an embroidery sewing machine in which an embroidery frame is moved in X- and Y-directions in accordance with the needle feeding data.

In the above-described embodiment, a relative position (combination position) in which any of the figure patterns G should be positioned with respect to each frame pattern W is determined for the each frame pattern W. In other words, in the case where any figure pattern G is to be combined with a frame pattern W, the any figure pattern G should be positioned at the same single combination position with respect to the frame pattern. However, the combination positions may set to be different from one another for the respective figure patterns to be combined with a frame pattern. In this case, the data for a pattern group 0 of a name tag arrangement data 45 with respect to each frame pattern shown in FIG. 8 may include a plurality of combination data for each figure pattern each of which consist of the data 55, 57 and 59.

As described above, according to the first aspect of the pattern data processing device of the present invention for the sewing machine, a pattern data for a composite pattern in which the selected unit-pattern(s) are arranged inside or outside of a reference pattern is obtained on the basis of the pattern data and the position-relevant data of the reference pattern and pattern data of the selected unit-pattern(s). Therefore, the sewing machine can automatically form the composite pattern, in accordance with the pattern data for the composite pattern thus synthesized. The operator can form the desired composite pattern consisting of a suitable combination of the selected patterns, through merely selecting the desired unit-pattern(s) and the desired reference pattern.

According to the second aspect of the pattern data processing device of the present invention for the sewing machine, irrespective of the number of the selected plural unit-patterns, the center position of the group consisting of the selected plural unit-patterns substantially coincides with the center position of the forming region which is previously set inside or outside of the reference pattern. Accordingly, a character array consisting of a combination of plural character patterns can be combined with the reference pattern with excellent appearance, irrespective of the number of the characters.

According to the third aspect of the pattern data processing device of the present invention for the sewing machine, the unit-patterns are aligned inside or outside of the reference pattern along the alignment direction which is represented by the position-relevant data, with the alignment of the unit-patterns being started or ended at the reference point which is represented by the position-relevant data. Therefore, diversity of the relative arrangement (layout) between the reference pattern and unit-patterns can be enhanced.

According to the fourth aspect of the pattern data processing device of the present invention, since a reference pattern as well as an unit-pattern can be arbitrarily selected, various composite patterns can be automatically formed.

What is claimed is:

1. A pattern data processing device for a sewing machine for processing signals representative of pattern data which is adapted for controlling the sewing machine to attain relative movement between a cloth to be stitched and a sewing needle of the sewing machine thereby forming a desired stitch pattern on the cloth, the pattern data processing device comprising:

unit pattern storing means for storing signals representative of a plurality of unit-pattern data of a plurality of unit-patterns;

reference pattern storing means for storing signals representative of pattern data of a reference pattern and position data for the reference pattern, the position data being indicative of a position at which the unit-pattern is to be arranged relative to the reference pattern;

unit-pattern selecting means for selecting signals representative of pattern data of a desired unit-pattern from said unit-pattern storing means;

synthesizing means for synthesizing signals representative of the selected unit-pattern and the reference pattern to obtain a composite pattern in which the selected unit-pattern is arranged relative to the reference pattern at the position represented by the position data and for calculating signals representative of composite pattern data of the composite pattern on the basis of the signals representative of the selected unit-pattern data, the signals representative of the reference pattern data and the signals representative of the position data; and composite pattern storing means for storing the signals representative of the composite pattern data of the composite pattern which is obtained by said synthesizing means.

2. The pattern data processing device as claimed in claim 1, wherein said unit-pattern selecting means selects a plurality of desired unit patterns, wherein the position data for the reference pattern represents a pattern forming region at which the unit-patterns are to be arranged, the pattern forming region being positioned relative to the reference pattern, and wherein said synthesizing means includes center-coincident pattern allot means for allotting the selected plural unit-patterns in the pattern forming region in such a manner that the center position of a unit-pattern group formed by the selected unit-patterns may coincide with the center position of the pattern forming region.

3. The pattern data processing device as claimed in claim 1, wherein said unit-pattern selecting means selects a plurality of unit-patterns, wherein the position data for the reference pattern includes data indicative of an alignment direction in which the selected plural unit-patterns are to be aligned with respect to the reference pattern and an alignment reference point based on which the selected plural unit-patterns are to be aligned with respect to the reference pattern, and wherein said synthesizing means includes alignment allot means for allotting the selected plural unit-patterns to be aligned along the alignment direction with respect to the alignment reference point relative to the reference pattern.

4. The pattern data processing device as claimed in claim 1, wherein said reference pattern storing means stores plural reference pattern data of plural reference patterns and plural position data for the plural reference patterns, each of the plural position data being indicative of a position at which the unit-pattern is to be arranged relative to the corresponding reference pattern.

5. The pattern data processing device as claimed in claim 4, further comprising reference pattern selecting means for selecting reference pattern data of a desired reference pattern and the position data therefor, from said reference pattern storing means.

6. The pattern data processing device as claimed in claim 2, wherein said reference pattern storing means stores plural reference pattern data of plural reference patterns and plural position data for the plural reference patterns, each of the plural position data being indicative of a position at which the unit-pattern is to be arranged relative to the corresponding reference pattern.

7. The pattern data processing device as claimed in claim 6, further comprising reference pattern selecting means for selecting reference pattern data of a desired reference pattern and the position data therefor, from said reference pattern storing means.

8. The pattern data processing device as claimed in claim 3, wherein said reference pattern storing means stores plural reference pattern data of plural reference patterns and plural position data for the plural reference patterns, each of the plural position data being indicative of a position at which the unit-pattern is to be arranged relative to the corresponding reference pattern.

9. The pattern data processing device as claimed in claim 8, further comprising reference pattern selecting means for selecting reference pattern data of a desired reference pattern and the position data therefor, from said reference pattern storing means.

10. The pattern data processing device as claimed in claim 1, wherein each of the plurality of unit-pattern data includes information on relative movement between a sewing needle of the sewing machine and the cloth required to attain a stitch pattern corresponding to the unit-pattern, the reference-pattern data includes information on relative movement between the sewing needle and the cloth required to attain a stitch pattern corresponding to the reference-pattern, and the composite-pattern data includes information on relative movement between the sewing needle and the cloth required to attain a stitch pattern corresponding to the composite-pattern.

11. The pattern data processing device as claimed in claim 3,
wherein the data indicative of the alignment reference point represents a start point from which the plurality of unit-patterns are to be aligned along the alignment direction with respect to the reference-pattern, the start point being determined relative to the reference-pattern,
wherein said alignment allot means allots the selected plural unit-patterns to be aligned along the alignment direction from the start point relative to the reference-pattern.

12. The pattern data processing device as claimed in claim 3,
wherein the data indicative of the alignment reference point represents an end point toward which the plurality of unit-patterns are to be aligned along the alignment direction with respect to the reference-pattern, the end point being determined relative to the reference-pattern,
wherein said alignment allot means allots the selected plural unit-patterns to be aligned along the alignment direction toward the end point relative to the reference-pattern.

13. A pattern data processing device for a sewing machine for processing signals representative of composite-pattern data of a desired composite-pattern in which a desired unit-pattern is placed at a predetermined position relative to a reference-pattern, the signals representative of the composite-pattern data being adapted for controlling the sewing machine to stitch, on a cloth, a stitch pattern corresponding to the desired composite-pattern, the pattern data processing device comprising:
unit-pattern storing means for storing signals representative of a plurality of unit-pattern data of a plurality of unit-patterns, each of the plurality of unit-pattern data including information on relative movement between a sewing needle of a sewing machine and a cloth required to attain a stitch pattern of the corresponding unit-pattern;
reference-pattern storing means for storing signals representative of reference-pattern data of a reference-pattern and position data for the reference-pattern, the reference-pattern data including information on relative movement between the sewing needle of the sewing machine and the cloth required to attain a stitch pattern of the reference-pattern, the position data being indicative of a predetermined position at which the unit-pattern is to be placed relative to the reference-pattern;
unit-pattern selecting means for selecting signals representative of unit-pattern data of a desired unit-pattern out of said unit-pattern storing means;
calculating means for synthesizing signals representative of the selected unit-pattern and the reference-pattern, on the basis of the signals representative of the unit-pattern data selected by said unit-pattern selecting means, the signals representative of the reference-pattern data and the position data, to thereby obtain signals representative of a composite-pattern in which the selected unit-pattern is placed at the predetermined position relative to the reference-pattern, and for calculating signals representative of composite-pattern data of the composite-pattern, the composite-pattern data including information on relative movement between the sewing needle of the sewing machine and the cloth required to attain a stitch pattern of the composite-pattern; and
output means for outputting the signals representative of the composite-pattern data to the sewing machine, to thereby control the sewing machine to stitch, on the cloth, a stitch pattern corresponding to the composite-pattern in which the selected unit-pattern is placed at the predetermined position relative to the reference-pattern.

14. A sewing machine for stitching, on a cloth, a desired composite-pattern in which a desired unit-pattern is placed at a predetermined position relative to a reference-pattern, the sewing machine comprising:
unit-pattern storing means for storing a plurality of unit-pattern data of a plurality of unit-patterns;
reference-pattern storing means for storing reference-pattern data of a reference-pattern and position data for the reference-pattern, the position data being indicative of a predetermined position at which the unit-pattern is to be placed relative to the reference-pattern;
unit-pattern selecting means for selecting unit-pattern data of a desired unit-pattern out of said unit-pattern storing means;
calculating means for synthesizing the selected unit-pattern and the reference-pattern, on the basis of the unit-pattern data selected by said unit-pattern selecting means, the reference-pattern data and the position data, to thereby obtain a composite-pattern in which the selected unit-pattern is placed at the predetermined position relative to the reference-pattern and for calculating composite-pattern data of the composite-pattern;
stitch forming means for forming stitches on a cloth in accordance with the composite-pattern data, to thereby form a stitch pattern corresponding to the composite-pattern in which the selected unit-pattern is placed at the predetermined position relative to the reference-pattern.

15. The sewing machine as claimed in claim 14, wherein said stitch forming means includes:
a sewing needle; and
drive means for attaining relative movement between the sewing needle and the cloth.

16. The sewing machine as claimed in claim 15,
wherein each of the plurality of unit-pattern data includes information on relative movement between the sewing needle and the cloth required to attain a stitch pattern corresponding to the unit-pattern, the reference-pattern data includes information on relative movement between the sewing needle and the cloth required to attain a stitch pattern corresponding to the reference-pattern, and the composite-pattern data includes information on relative movement between the sewing needle and the cloth required to attain a stitch pattern corresponding to the composite-pattern, and
wherein the drive means of said stitch forming means attains the relative movement between the sewing needle and the cloth in accordance with the composite-pattern data.

17. The sewing machine as claimed in claim 14, further comprising composite-pattern storing means for temporarily storing the composite-pattern data calculated by said calculating means until when said stitch forming means forms stitches on the cloth in accordance with the composite-pattern data.

18. The sewing machine as claimed in claim 14,
wherein said unit-pattern selecting means selects more than one desired unit-pattern, the more than one desired unit-pattern forming a unit-pattern group, wherein the position data for the reference-pattern includes information on a unit-pattern forming region at which the unit-pattern group is to be placed, the unit-pattern forming region being positioned at a predetermined area relative to the reference pattern, and
wherein said calculating means includes center-coinciding means for allotting the unit-pattern group in the unit-pattern forming region in such a manner that the center position of the unit-pattern group may coincide with the center position of the unit-pattern forming region, to thereby obtain the composite-pattern.

19. The sewing machine as claimed in claim 14,
wherein said unit-pattern selecting means selects more than one desired unit-pattern, wherein the position data for the reference-pattern includes information on an alignment direction in which the unit-patterns are to be aligned relative to the reference-pattern and on an alignment reference position based on which the unit-patterns are to be positioned with respect to the reference-pattern, the alignment direction and the alignment reference position being determined relative to the reference-pattern, and
wherein said calculating means includes aligning means for allotting the selected unit-patterns to be aligned along the alignment direction with respect to the alignment reference position relative to the reference-pattern.

20. The sewing machine as claimed in claim 19,
wherein the information on the alignment reference position represents a start point from which the unit-patterns are to be aligned along the alignment direction with respect to the reference-pattern, the start point being determined relative to the reference-pattern, and
wherein said aligning means allots the selected unit-patterns to be aligned along the alignment direction from the start point relative to the reference-pattern.

21. The sewing machine as claimed in claim 19,
wherein the information on the alignment reference position represents an end point toward which the unit-patterns are to be aligned along the alignment direction with respect to the reference-pattern, the end point being determined relative to the reference-pattern, and
wherein said aligning means allots the selected unit-patterns to be aligned along the alignment direction to reach the end point relative to the reference-pattern.

22. The sewing machine as claimed in claim 14,
wherein said reference-pattern storing means stores a plurality of reference-pattern data of a plurality of reference-patterns and a plurality of position data for the plurality of reference-patterns, each of the plurality of position data being indicative of a predetermined position at which the unit-pattern is to be placed relative to the corresponding reference-pattern, and
further comprising reference-pattern selecting means for selecting, out of said reference-pattern storing means, reference-pattern data of a reference-pattern desired to be combined with the desired unit-pattern into the composite-pattern and position data therefor,
wherein said calculating means synthesizes the selected unit-pattern and the selected reference-pattern, on the basis of the unit-pattern data selected by said unit-pattern selecting means and the reference-pattern data and the position data selected by said reference-pattern selecting means, to thereby obtain a composite-pattern in which the selected unit-pattern is placed at the predetermined position relative to the selected reference-pattern and for calculating composite-pattern data of the composite-pattern, and
wherein said stitch forming means forms stitches on the cloth in accordance with the composite-pattern data, to thereby form a stitch pattern corresponding to the composite-pattern in which the selected unit-pattern is placed at the predetermined position relative to the selected reference-pattern.

23. The sewing machine as claimed in claim 22,
wherein said stitch forming means includes:
a sewing needle; and
drive means for attaining relative movement between the sewing needle and the cloth.

24. The sewing machine as claimed in claim 23,
wherein each of the plurality of unit-pattern data includes information on relative movement between the sewing needle and the cloth required to attain a stitch pattern corresponding to the unit-pattern, each of the plurality of reference-pattern data includes information on relative movement between the sewing needle and the cloth required to attain a stitch pattern corresponding to the reference-pattern, and the composite-pattern data includes information on relative movement between the sewing needle and the cloth required to attain a stitch pattern corresponding to the composite-pattern, and
wherein the drive means of said stitch forming means attains the relative movement between the sewing needle and the cloth in accordance with the composite-pattern data.

25. The sewing machine as claimed in claim 22,
wherein said unit-pattern selecting means selects more than one desired unit-pattern, the more than one desired unit-pattern forming a unit-pattern group, wherein the position data for each of the plurality of reference-patterns includes information on a unit-pattern forming region at which the unit-pattern group is to be placed with respect to the corresponding reference-pattern, the unit-pattern forming region being positioned at a predetermined area relative to the corresponding reference-pattern, and
wherein said calculating means includes center-coinciding means for allotting the unit-pattern group in the unit-pattern forming region for the selected reference-pattern in such a manner that the center position of the unit-pattern group may coincide with the center position of the unit-pattern forming region for the selected reference-pattern, to thereby obtain the composite-pattern.

26. The sewing machine as claimed in claim 22, wherein said unit-pattern selecting means selects more than one desired unit-pattern, wherein the position data for each of the plurality of reference-patterns includes information on an alignment direction in which the unit-patterns are to be aligned relative to the corresponding reference-pattern and on an alignment reference position based on which the unit-patterns are to be positioned with respect to the corresponding reference-pattern, the alignment direction and the alignment reference position being determined relative to the corresponding reference-pattern, and wherein said calculating means includes aligning means for allotting the selected unit-patterns to be aligned along the alignment direction with respect to the alignment reference position relative to the selected reference-pattern.

27. The sewing machine as claimed in claim 26, wherein the position data for each of the plurality of reference-patterns includes the information on the alignment reference position which represents a start point from which the unit-patterns are to be aligned along the alignment direction with respect to the corresponding reference-pattern, the start point being determined relative to the corresponding reference-pattern, and wherein said aligning means allots the selected unit-patterns to be aligned along the alignment direction from the start point relative to the selected reference-pattern.

28. The sewing machine as claimed in claim 26, wherein the position data for each of the plurality of reference-patterns includes the information on the alignment reference position which represents an end point toward which the unit-patterns are to be aligned along the alignment direction with respect to the corresponding reference-pattern, the end point being determined relative to the corresponding reference-pattern, and wherein said aligning means allots the selected unit-patterns to be aligned along the alignment direction toward the end point relative to the selected reference-pattern.

* * * * *